(12) United States Patent
Jarriel et al.

(10) Patent No.: US 11,863,284 B2
(45) Date of Patent: Jan. 2, 2024

(54) SYSTEMS AND METHODS FOR POST-DETECT COMBINING OF A PLURALITY OF DOWNLINK SIGNALS REPRESENTATIVE OF A COMMUNICATION SIGNAL

(71) Applicant: KRATOS INTEGRAL HOLDINGS, LLC, San Diego, CA (US)

(72) Inventors: Jeffrey David Jarriel, San Diego, CA (US); Daniel Joseph Sutton, San Diego, CA (US); Matthew James Stoltenberg, San Diego, CA (US); Brandon Gregory King, San Diego, CA (US)

(73) Assignee: KRATOS INTEGRAL HOLDINGS, LLC, San Diego, CA (US)

( * ) Notice: Subject to any disclaimer, the term of this patent is extended or adjusted under 35 U.S.C. 154(b) by 299 days.

(21) Appl. No.: 17/332,349

(22) Filed: May 27, 2021

(65) Prior Publication Data
US 2022/0385353 A1 Dec. 1, 2022

Related U.S. Application Data

(63) Continuation of application No. PCT/US2021/033867, filed on May 24, 2021.

(51) Int. Cl.
*H04B 7/08* (2006.01)
*G06F 11/14* (2006.01)

(52) U.S. Cl.
CPC ....... *H04B 7/0885* (2013.01); *G06F 11/1415* (2013.01); *G06F 2201/86* (2013.01)

(58) Field of Classification Search
CPC .. H04B 7/0857; H04B 7/0885; H04B 7/0888; H04B 7/0413; H04B 7/02; G06F 11/1415
(Continued)

(56) References Cited

U.S. PATENT DOCUMENTS 5,233,626 A 8/1993 Ames
5,585,803 A 12/1996 Miura et al.
(Continued)

FOREIGN PATENT DOCUMENTS

EP 3537679 A1 9/2019
JP 2003-152817 A 5/2003
(Continued)

OTHER PUBLICATIONS

International Search Report and Written Opinion of PCT/US2021/033905 dated Apr. 4, 2022. 15 pages.
(Continued)

*Primary Examiner* — Emmanuel Bayard
(74) *Attorney, Agent, or Firm* — Procopio, Cory, Hargreaves & Savitch LLP

(57) ABSTRACT

Embodiments of systems and methods for combining downlink signals representative of a communication signal are provided herein. An example method comprises receiving samples of the downlink signals from multiple antenna feeds; generating first symbols for a first signal and second symbols for a second signal based on performing timing recovery operations on the first signal and the second signal, respectively; generating offset information based on performing a correlator operation on the first and second symbols; and combining the first and second signals based on performing a weighted combiner operation. At least one of the first timing recovery operation, the second timing recovery operation, the correlator operation, and the combing are performed in a plurality of processing blocks in one or more processors, wherein the first and second processing block operate in parallel.

20 Claims, 8 Drawing Sheets

(58) Field of Classification Search
USPC .................................. 375/267, 299, 347, 349
See application file for complete search history.

(56) References Cited

U.S. PATENT DOCUMENTS

| | | | |
|---|---|---|---|
| 6,111,910 A * | 8/2000 | Cui | H04B 7/0854 |
| | | | 375/150 |
| 6,226,323 B1 | 5/2001 | Tan et al. | |
| 6,542,480 B1 | 4/2003 | Campanella | |
| 6,781,968 B1 | 8/2004 | Colella et al. | |
| 6,842,495 B1 | 1/2005 | Jaffe et al. | |
| 8,953,698 B2 * | 2/2015 | Lindoff | H04L 27/2647 |
| | | | 375/267 |
| 10,177,952 B1 | 1/2019 | Beeler et al. | |
| 10,541,852 B2 | 1/2020 | Stanciu et al. | |
| 10,644,916 B1 | 5/2020 | Shattil | |
| 10,790,920 B2 | 9/2020 | King et al. | |
| 11,552,737 B1 * | 1/2023 | Shattil | H04L 1/0077 |
| 2002/0085648 A1 | 7/2002 | Burns et al. | |
| 2003/0142726 A1 * | 7/2003 | Eltawil | H04B 1/709 |
| | | | 375/147 |
| 2003/0219085 A1 | 11/2003 | Endres et al. | |
| 2004/0141575 A1 | 7/2004 | Chen | |
| 2004/0190649 A1 | 9/2004 | Endres et al. | |
| 2005/0078649 A1 * | 4/2005 | Tehrani | H04L 27/2665 |
| | | | 370/343 |
| 2006/0034406 A1 | 2/2006 | Lee | |
| 2006/0291599 A1 | 12/2006 | Strodtbeck et al. | |
| 2007/0019750 A1 * | 1/2007 | Gaikwad | H04B 7/0851 |
| | | | 375/267 |
| 2007/0092018 A1 | 4/2007 | Fonseka et al. | |
| 2007/0297372 A1 | 12/2007 | Fatemi-Ghomi et al. | |
| 2008/0089458 A1 | 4/2008 | Wallace et al. | |
| 2008/0159123 A1 * | 7/2008 | Tehrani | H04L 27/2663 |
| | | | 370/208 |
| 2009/0003493 A1 | 1/2009 | Gunturi et al. | |
| 2009/0007201 A1 | 1/2009 | Erenberg et al. | |
| 2009/0040103 A1 | 2/2009 | Chansarkar et al. | |
| 2009/0041167 A1 * | 2/2009 | Kadota | H04L 27/2676 |
| | | | 329/304 |
| 2011/0002366 A1 * | 1/2011 | Michaels | H04J 13/0018 |
| | | | 375/150 |
| 2011/0026579 A1 | 2/2011 | Yang | |
| 2011/0129041 A1 | 6/2011 | Ishihara et al. | |
| 2011/0222584 A1 * | 9/2011 | Michaels | H04J 13/0018 |
| | | | 375/130 |
| 2012/0069941 A1 * | 3/2012 | Herbig | H04L 7/005 |
| | | | 375/347 |
| 2012/0096061 A1 | 4/2012 | Hauske | |
| 2012/0134511 A1 | 5/2012 | Vilermo et al. | |
| 2012/0155528 A1 | 6/2012 | Zhong | |
| 2013/0006601 A1 | 1/2013 | Mlinarsky et al. | |
| 2013/0115903 A1 * | 5/2013 | Kroeger | H04B 7/0885 |
| | | | 455/193.1 |
| 2013/0177115 A1 | 7/2013 | Yang et al. | |
| 2013/0315346 A1 | 11/2013 | Varma et al. | |
| 2014/0219374 A1 | 8/2014 | Pisek | |
| 2014/0273815 A1 | 9/2014 | Jayasimha | |
| 2014/0321582 A1 | 10/2014 | Cheng et al. | |
| 2015/0146805 A1 | 5/2015 | Terry | |
| 2015/0208257 A1 | 7/2015 | Marini et al. | |
| 2017/0353228 A1 | 12/2017 | Watson et al. | |
| 2018/0069631 A1 | 3/2018 | Ashrafi | |
| 2018/0248676 A1 | 8/2018 | Raggio et al. | |
| 2019/0372819 A1 | 12/2019 | Jong et al. | |
| 2020/0204281 A1 | 6/2020 | King et al. | |
| 2020/0313730 A1 | 10/2020 | Lea et al. | |

FOREIGN PATENT DOCUMENTS

| | | |
|---|---|---|
| JP | 2003-169101 A | 6/2003 |
| JP | 2017-513417 A | 5/2017 |
| WO | 2019243565 A1 | 12/2019 |

OTHER PUBLICATIONS

International Search Report and Written Opinion for corresponding application No. PCT/US2021/033867 dated Feb. 14, 2022, in 11 pages.
International Search Report and Written Opinion for corresponding application No. PCT/US2021/033875 dated Feb. 14, 2022, in 14 pages.
Zhou. "Efficient Clock and Carrier Recovery Algorithms for Single Carrier Coherent Optical Systems: A systematic review on challenges and recent progress." Feb. 19, 2014. IEEE, IEEE Signal Processing Magazine. 31(2):35-45 (Mar. 2014).
Barros et al. "A Soft-Handover Scheme for LEO Satellite Networks." IEEE 78th Vehicular Technology Conference, Sep. 2, 2013, pp. 1-5.
Callaghan et al. "An investigation of site diversity and comparison with ITU-R recommendations." Radio Science. vol. 43, No. 4. Aug. 1, 2008. 8 pages.
International Search Report and Written Opinion for corresponding application No. PCT/US2019/064183, dated Mar. 12, 2020, in 13 pages.
International Search Report and Written Opinion for corresponding application No. PCT/US2020/065351, dated Apr. 23, 2021, in 16 pages.
International Search Report and Written Opinion for corresponding application No. PCT/US2020/065358 dated Apr. 21, 2021, in 15 pages.
Notice of Allowance dated May 4, 2022 in U.S. Appl. No. 17/031,507.
Office Action dated Aug. 24, 2023 in Japanese Patent Application No. 2021-535675.

* cited by examiner

SYSTEMS AND METHODS FOR POST-DETECT COMBINING OF A PLURALITY OF DOWNLINK SIGNALS REPRESENTATIVE OF A COMMUNICATION SIGNAL

CROSS-REFERENCE TO RELATED APPLICATIONS

This application is a bypass continuation of PCT/US2021/033867, filed on May 24, 2021, the disclosure of which is incorporated by reference in its entirety herein.

BACKGROUND

Technical Field

This disclosure relates to signal processing. More specifically, this disclosure relates to implementing distributed computing using a general-purpose processor to achieve high-rate processing.

Description of the Related Art

In some examples, a satellite communication signal can require large ground stations and other facilities to transmit and/or receive and process data locally. This can include extensive antenna arrays, associated radio frequency terminals (RFTs), and significant electronics (modems, signal processors, etc.) to receive, process, and use the data received from an associated satellite.

SUMMARY

This disclosure provides for an improved communication system. The following summary is not intended to define every aspect of the invention, and other features and advantages of the present disclosure will become apparent from the following detailed description, including the drawings. The present disclosure is intended to be related as a unified document, and it should be understood that all combinations of features described herein are contemplated, even if the combination of features are not found together in the same sentence, paragraph, or section of this disclosure. In addition, the disclosure includes, as an additional aspect, all embodiments of the invention narrower in scope in any way than the variations specifically mentioned herein.

As disclosed herein, digital signal processing (DSP) can be performed in many different ways using general purpose processors, or central processing units (CPUs). Example techniques executed on a general purpose processor to achieve high rate processing that can perform the disclosed functions include, but are not limited to:

using multiple CPUs and the parallel processing on the many cores of each CPU;
  employing single instruction, multiple data (SIMD) techniques;
  feed-forward processing to break up feed-back loops;
  pre-calculation of metadata (or state information) to divide the heavy processing over several CPUs; and
  collection of multiple functions into a single function in a manner that increases CPU performance or lowers memory bandwidth utilization.

One way to increase through-put on a general-purpose CPU is to utilize as many cores as possible that exist on the CPU. Great care must be taken to ensure data is properly shared amongst several cores within the CPU but this allows for processing throughput to increase with the addition of more CPU cores. It is also possible to use several CPUs on the same system, with each CPU containing multiple cores. All embodiments within this disclosure take advantage of using multiple cores within a CPU, and some embodiments take advantage of having multiple CPUs per system and/or even groups of systems in a server environment.

Another way to achieve high processing rates is to take advantage of single instruction, multiple data (SIMD) capabilities of general-purpose CPUs. This allows a single CPU core to perform up to 16 floating point operations on a single instruction, as is the case of AVX512 SIMD operations. One example of employing SIMD is using a finite impulse response (FIR) filter function in which 16 floating point results are calculated at once. Another example is when multiplying complex numbers together. Instead of calculating one pair of quadrature signals (IQ data), it is possible with AVX512 to calculate eight IQ pairs at a time. Complex multiplication is used in nearly every processing algorithm described in this disclosure.

Some processing systems implement various forms of feedback, often including a phase lock loop (PLL) or a delay lock loop (DLL). However, feedback in general as is the case for PLLs and DLLs can be problematic because the very nature of the feedback causes bottlenecking. The feedback loop forces all the incoming data to be processed on a single (e.g., linear) process that cannot not be easily split or otherwise divided. In addition to the feedback, there are other obstacles to overcome using PLLs and DLLs including how often to calculate the error term. The feedback loop can be replaced with a feed-forward loop in which error states can be processed on a block of data and then the calculated error term is fed-forward to another block which applies the error term. If proper overlap is used, the error calculation and application of that term can be split over several CPU cores to further increase through-put. One example of this is in the diversity combiner where the timing and phase correction is calculated in one block and the timing adjustment is applied in another block and the phase correction in yet another block. This method as a set can then be parallelized over several CPU cores to further increase through-put.

In addition to feed-forward approach to processing data, it can be beneficial to perform pre-calculation of metadata in a single block that then splits up the processing of the data over several CPU cores. This method is similar to the feed-forward methodology already discussed, but in this case, it is not breaking up a loop (such as feed-back loop) but simply leveraging many CPU cores to increase the amount of data that can be processed. In this way the block that performs the pre-calculation does not perform the CPU intensive processing but calculates the needed steps such as iterations within a for-loop and start indices and slope points between interpolation phases values. One such example of this is Doppler Compensation performed in the Diversity combiner. The needed phase adjustments are created in the first block but the CPU intensive calculation to perform the phase adjustment is handed off to subsequent blocks downstream. If the second portion of the processing is the CPU intensive portion, this allows for any number of CPU cores to be utilized and therefore increase processing rate that otherwise could not be achieved within a single block.

Another technique that can be employed on general purpose CPUs to achieve high through-put is the way the set of functions is employed and memory type used. In some cases, memory bandwidth becomes the limiting factor in performance. If this is the case, the goal is to limit the amount of data that needs to transferred to and from random-access memory (RAM) (not faster memory like CPU cache). In order to do this, functions need to be collapsed so that they all run together instead of individually with goal of accessing slower RAM as little as possible as compared to accessing faster CPU cache. Another method to lowering memory bandwidth is utilizing properly spaced memory types, e.g., using int8 when possible versus floats or doubles.

In an embodiment, a method for combining a plurality of downlink signals representative of a communication signal is provided herein. The method comprises receiving samples of the plurality of downlink signals from a plurality of antenna feeds; generating first symbols for a first signal of the plurality of downlink signals based on performing a first timing recovery operation on first samples of the first signal; generating second symbols for a second signal of the plurality of downlink signals based on performing a second timing recovery operation on second samples of the second signal; generating time and phase offset information based on performing a correlator operation on the first and second symbols; and combining the first signal and the second signal based on (i) the first and second symbols, (ii) aligning timing and phase of the first symbols with the second symbols based on the time and phase offset information, and (iii) performing a weighted combiner operation that applies scaling to each of the first and second data packets based on corresponding signal quality. Wherein at least one of the first timing recovery operation, the second timing recovery operation, the correlator operation, and the combing are performed in a plurality of processing blocks in one or more processors, wherein the first and second processing block operated in parallel.

In another embodiment, a system is provided for combining a plurality of downlink signals representative of a communication signal. The system comprises a plurality of antennas configured to receive the plurality of downlink signals and one or more processors communicatively coupled to the plurality of antennas, the one or more processors having a plurality of processing blocks. The one or more processors are operable to perform the method described above.

In another embodiment, an apparatus is provided for combining a plurality of downlink signals representative of a communication signal. The apparatus comprises a means for receiving samples of the plurality of downlink signals from a plurality of antenna feeds; a means for generating first symbols for a first signal of the plurality of downlink signals based on performing a first timing recovery operation on first samples of the first signal; a means for generating second symbols for a second signal of the plurality of downlink signals based on performing a second timing recovery operation on second samples of the second signal; a means for generating time and phase offset information based on performing a correlator operation on the first and second symbols; and a means for combining the first signal and the second signal based on (i) the first and second symbols, (ii) aligning timing and phase of the first symbols with the second symbols based on the time and phase offset information, and (iii) performing a weighted combiner operation that applies scaling to each of the first and second data packets based on corresponding signal quality. Where at least one of the means for generating first symbols, the means for generating second symbols, the means for generating time and phase offset information, and the means for combining are performed in a plurality of processing blocks in one or more processors, wherein the first and second processing block operate in parallel.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
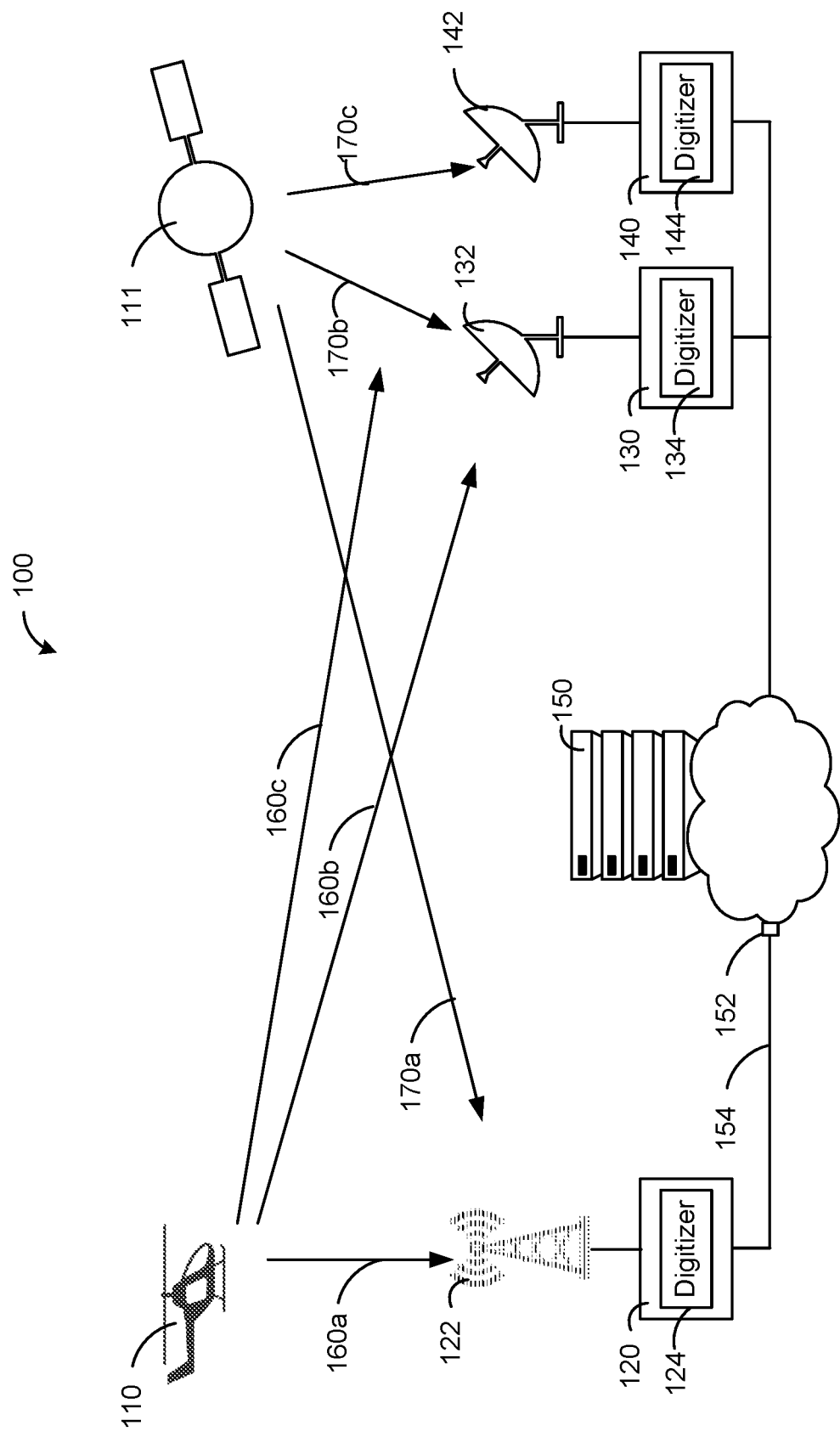
FIG. 1 is a graphical representation of an example of a communication system, in accordance with the embodiments disclosed herein.

Embodiments of an improved communication system using a general-purpose processor to achieve high-rate processing are disclosed. Embodiments disclosed herein provide for improved communication systems capable of utilizing a general-purpose processor to efficiently achieve a high-rate of signal processing. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A communication system is used as a primary example throughout the description, however, the application of the disclosed methods is not so limited. For example, any wireless or radio communication system requiring the use of digital signal processing, a modem, etc., can implement the systems, methods, and computer readable media described herein.

This disclosure provides systems and methods for performing Digital Signal Processing using general purpose central processing units (CPUs) in either a standard server environment or a virtualized cloud environment. In some examples, the systems can employ single-instruction multiple data (SIMD) techniques to achieve high throughput including SSE, SSE2, SSE3, SSE4.1, SSE4.2, AVX, AVX2 and AVX512 instruction sets. This disclosure describes how the data processing is managed over multiple processing cores of the processors (e.g., CPUs) to achieve the necessary throughput without the use of dedicated signal processing hardware such as Field Programmable Gate Arrays (FPGAs) or High Performance Computing (HPC) hardware such as Graphics Processing Units (GPUs). The ability to perform this processing in general-purpose server CPUs, including but not limited to x86 architecture made by Intel and AMD micro-processors, as well as ARM processors like Cortex-A76, NEON and AWS Graviton and Graviton2, allows the functions to be deployed within a general-purpose cloud processing environment using a virtualized processing architecture without the need for dedicated hardware. The processing in general purpose CPUs is enabled by a Digital IF appliance that samples the analog signal and feeds the digitized samples into the CPU over an Ethernet connection. The Digital IF appliance can also accept digitized samples and covert to an analog signal, similar to that described in U.S. Pat. No. 9,577,936, issued Feb. 21, 2017, entitled "Packetized Radio Frequency Transport System" the contents of which are incorporated by reference in their entirety.

FIG. 1 is a graphical representation of an embodiment of a communication system. A communication system (system) 100 can have a platform 110 and a satellite 111 that communicate with a plurality of ground stations. The platform 110 can be an aircraft (e.g., an airplane, helicopter, or unmanned aerial vehicle (UAV), missile, boat, etc.). A plurality of ground stations 120, 130, 140 can be associated with a terrestrial radiofrequency (RF) antenna 122 or one or more satellite antennas 132, 142. The ground station 120 can have an antenna 122 coupled to a digitizer 124. The digitizer 124 can have one or more analog to digital converters (A2D) for converting analog signals received at the antenna 122 into a digital bit stream for transmission via a network. The digitizer 124 can also include corresponding digital to analog converters (D2A) for operations on the uplink to the platform 110 and the satellite 111.

Similarly, the ground station 130 can have an antenna 132 and a digitizer 134, and the ground station 140 can have an antenna 142 and a digitizer 144.

The ground stations 120, 130, 140 can each receive downlink signals 160 (labeled 160a, 160b, 160c) from the platform 110 and the downlink signals 170 (labeled 170a, 170b, 170c) from the satellite 111 in a receive chain. The ground stations 120, 130, 140 can also transmit uplink signals via the respective antennas 122, 132, 142 in a transmit chain. The digitizers 124, 134, 144 can digitize the received downlink signals 160, 170 for transmission as a digital bit stream 154. The digital bit stream 154 can then be transmitted, via a network 152 to a cloud processing system.

In some examples, the ground stations 120, 130, 140 can process all of the data (e.g., contained in the downlink signals) locally, however this can be exceptionally expensive from a time, resource, and efficiency perspective.

Therefore, in some embodiments, the downlink signals can be digitized and transmitted as the digital bit stream 152 to a remote signal processing server (SPS) 150. In some implementations, the SPS 150 can be positioned in a physical location, such as a data center located in an offsite facility that is accessible via a wide area network (WAN). Such a WAN can be the Internet, for example. The SPS 150 can demodulate the downlink signals from the digital bit stream 152 and output the data or information bits from the downlink signals. In some other implementations, the SPS 150 can use cloud computing or cloud processing to perform the signal processing and other methods described herein. The SPS 150 can also be referred to as a cloud server.

The SPS 150 can then provide the processed data to the user or send to a different site. The data and information can be mission-dependent. In addition, the information contained in the data can be the main purpose of the satellite, including weather data, image data, and satellite communication (SATCOM) payload data. As noted above, SATCOM is used as a primary example herein, but any communication or signal processing system using DSP can implement the methods described herein.

In order to achieve high processing rates with software, a phase lock loop (PLL) or delay lock loop (DLL) approach can be problematic due to the feedback within the loop. The feedback loop forces all of the incoming data (e.g., the downlink signal 160 and/or 170) to be processed on a single (e.g., linear) process that cannot be easily split or otherwise divided. In addition to the feedback, there are other obstacles to overcome using the PLL/DLL including, for example, how often to calculate the error term.

Figure 2:
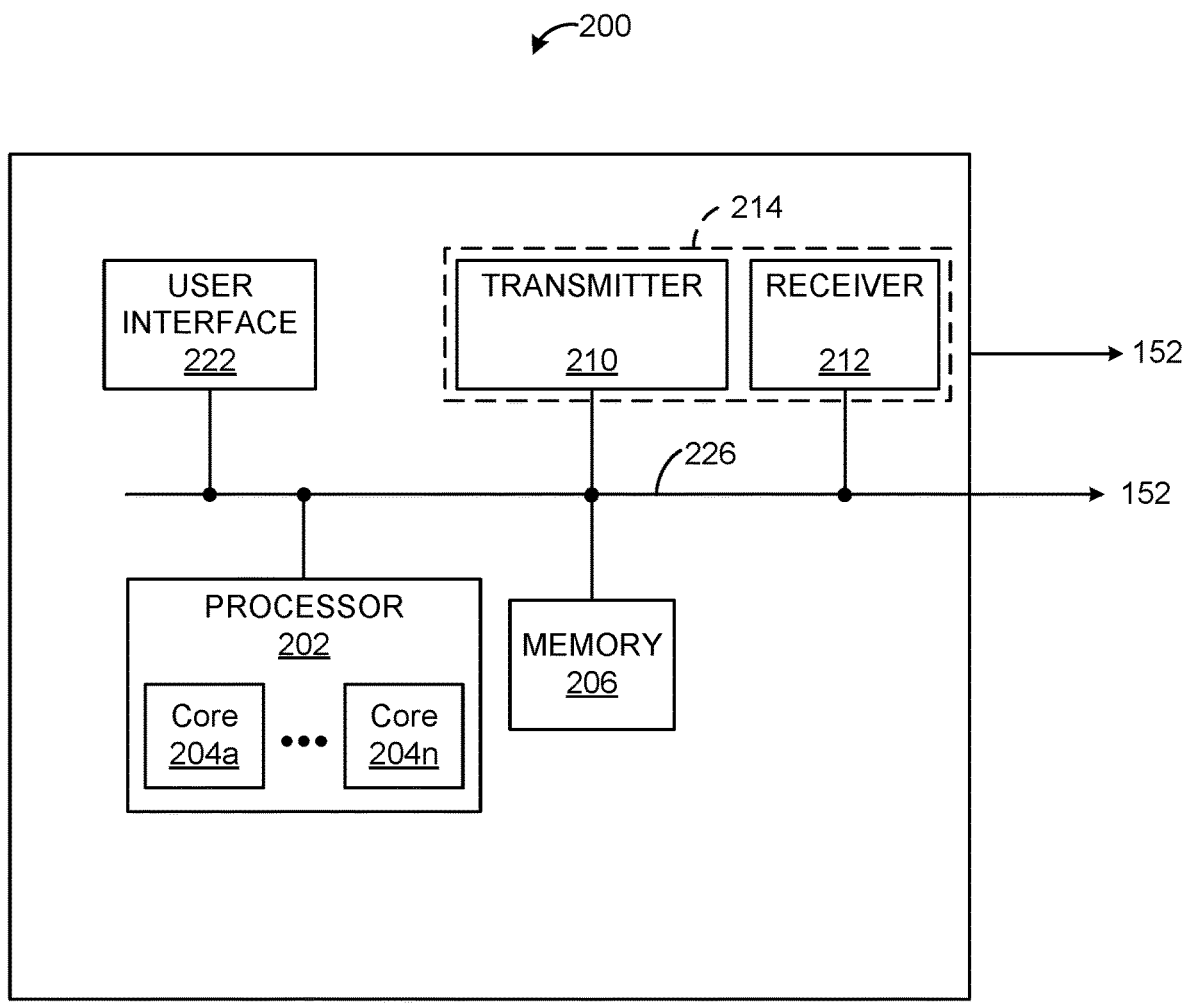
FIG. 2 is a functional block diagram of a wired or wireless communication device for use as one or more components of the system of FIG. 1.

FIG. 2 is a functional block diagram of a wired or wireless communication device for use as one or more components of the system of FIG. 1. A processing device (device) 200 may be implemented as, for example, the SPS 150 of FIG. 1. The device 200 can be implemented as needed to perform one or more of the signal processing methods or steps disclosed herein.

The device 200 may include a processor 202 which controls operation of the device 200. The processor 202 may also be referred to as a CPU. The processor 202 can direct and/or perform the functions, for example, attributed to SPS 150. Certain aspects of the device 200, including the processor 202, can be implemented as various cloud-based elements, such as cloud-based processing. Accordingly, the processor 202 can represent cloud processing, distributed over several disparate processors via a network (e.g., the Internet). Alternatively, certain components can be implemented in hardware. The processor 202 may be implemented with any combination of one or more of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 202 can have one or more cores 204 (shown as core 204a through core 204n) on which the computations can be performed. In implementations using cloud processing, the cores 204 can represent multiple iterations of distributed cloud processing. In some embodiments, using hardware, the processor 202 can be a complex, integrated circuit on which all the computations for the receiver are taking place. As used herein, the cores 204 can each be one processing element of the processor 202. The processor 202 can implement multiple cores 204 to perform the necessary parallel processing for the methods disclosed herein. In some embodiments, the processor 202 may be distributed across multiple CPUs as in cloud computing.

The device 200 may further include a memory 206 operably coupled to the processor 202. The memory 206 can be cloud-based storage or local hardware storage. The memory 206 can include both read-only memory (ROM) and random access memory (RAM), providing instructions and data to the processor 202. A portion of the memory 206 may also include non-volatile random access memory (NVRAM). The processor 202 typically performs logical and arithmetic operations based on program instructions stored within the memory 206. The instructions in the memory 206 may be executable to implement the methods described herein. The memory 206 can further include removable media or multiple distributed databases.

The memory 206 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 202 or the one or more cores 204, cause the device 200 (e.g., the SPS 150) to perform the various functions described herein.

The device 200 may also include a transmitter 210 and a receiver 212 to allow transmission and reception of data between the communication device 200 and a remote location. Such communication can occur between the ground station 120 and the SPS 150 via the network 152, for example. Such communications can be wireless or conducted via wireline communications. The transmitter 210 and receiver 212 may be combined into a transceiver 214. The transceiver 214 can be communicatively coupled to the network 152. In some examples the transceiver 214 can include or be a portion of a network interface card (NIC).

The device 200 may further comprise a user interface 222. The user interface 222 may comprise a keypad, a microphone, a speaker, and/or a display. The user interface 222 may include any element or component that conveys information to a user of the device 200 and/or receives input from the user.

The various components of the device 200 described herein may be coupled together by a bus system 226. The bus system 226 may include a data bus, for example, as well as a power bus, a control signal bus, and a status signal bus in addition to the data bus. In some embodiments, the bus system 226 can be communicatively coupled to the network 152. The network 152 can provide a communication link between the device 200 (e.g., the processor 202) and the ground station 120, for example. Those of skill in the art will appreciate the components of the device 200 may be coupled together or accept or provide inputs to each other using some other mechanism such as a local- or wide area network for distributed processing.

Figure 3:
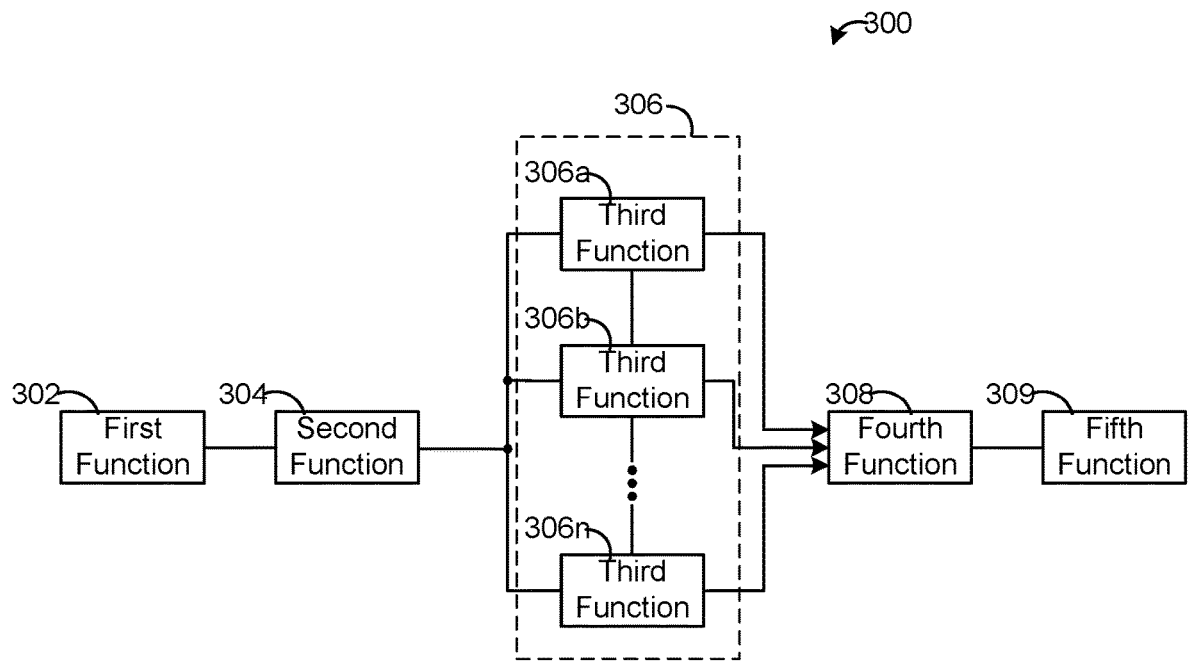
FIG. 3 is a graphical depiction of an example of feedforward or pre-calculation signal processing, in accordance with embodiments disclosed herein.

FIG. 3 is a graphical depiction of schematic block diagram of an embodiment of feedforward or pre-calculation signal processing 300. A method 300 can occur as a generalized process incorporating a plurality of functions by, for example, the processor 202. The processor 202 can perform the plurality of functions in a series or in parallel arrangement as shown to perform one or more desired processes. Each function may refer to a block or collection of instructions or software executable by the processor 202 and stored in a memory 206.

A first function 302 can be performed by the processor 202. In some embodiments, a second function 304 can be performed serially, following the first function 302. Accordingly, the processor 202 can split blocks of data with the different functionality for processing over multiple cores 204 to perform the first function 302 and the second function 304.

The processor 202 can perform distributed processing of a third function 306 (shown as 306a, 306b, . . . 306n) in parallel, following the second function 304. To indicate that various number of functions 306a-306n may operate in parallel, three paths are depicted with three vertical dots between them indicating that any number of paths can be included, such as, but not limited to, four, five, six, etc. The parallel processing of the third function 306 can include, for example, splitting blocks of data associated with the same functionality over several cores 204 (e.g., processing blocks) of the processor 202. For example, "blocks of data" can mean a group of samples that need to be processed.

The term "parallel" is used herein to describe that processing occurs in the blocks 306a-306n at the same time. The packets being processed may be of different lengths from one block 306a-306n to another, so the processing of packets may have the same rate or speed from one block 306a-306n to the next. As noted below, some of the bocks 306a-306n may proceed faster or slower than others. Accordingly, the term parallel should not be limited to simultaneous or concurrent processing within the blocks 306a-306n.

The processor 202 can then perform a fourth function 308, and a fifth function 309 in series. Similar to the first function 302 and the second function 304, the serial performance of the fourth function 308 and the fifth function 309 can include splitting blocks of data associated with the different functionality for processing over multiple cores 204. In general, each of the first function 302, the second function 304, the third function 306, the fourth function 308, and the fifth function 309 can each be performed in a different processing block. As used herein, a processing block can refer to a specific task performed on a block of data. The processing block can be associated with one or more of the cores 204, for example.

Therefore, the method 300 can split blocks of data with the same functionality to process over multiple cores 204, for example. Similarly, the method 300 can split blocks of data with different functionality to process over multiple cores 204.

In some other implementations of the method 300, the same processing blocks (e.g., the cores 204) can perform processing of data with single instruction, multiple data (SIMD), irrespective of the same or different functionality.

In other implementations, the embodiments of the method 300 can support processing blocks of data with minimal state information by using overlapping data. As used herein, state information can include variables needed during feedback (e.g., feedback processing), data frame boundaries, etc. For example, in the case of feedback loops, state information can include the variables calculated within the loop that are needed during feedback in processing a continuous stream of data. State information can also include the location of a frame boundary within a data stream. Other examples can include things such as FIR filters where the state information includes values stored in buffers (e.g., possibly many delay elements) that are needed to keep continuous data flowing.

By ignoring state information and overlapping portions of adjacent blocks of data, processes can take advantage of parallel processing, using a variable level of overlap amongst the blocks of data.

Figure 4:
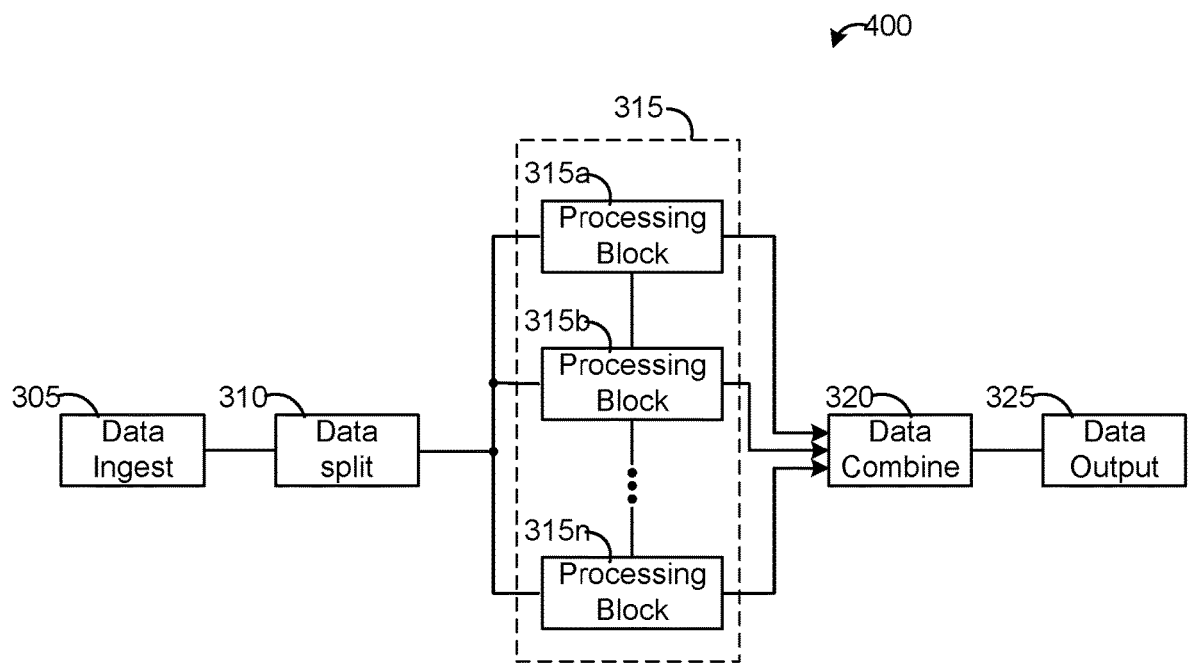
FIG. 4 is a graphical depiction of another example of feedforward or pre-calculation signal processing of FIG. 3, in accordance with embodiments disclosed herein.

FIG. 4 is a graphical depiction of an embodiment of a method for feedforward or pre-calculation signal processing of FIG. 3. A method 400 can use the principles of the method 300 for series-parallel and/or parallel-series processing for multiple functions grouped as a process 315. In one example, the first function 302 (FIG. 3) can be a data ingest function 305, in which the processor 202 receives data for processing. The second function 304 (FIG. 3) can be a data split function 310, in which the processor 202 can parse data in overlapping blocks of data. The overlapped blocks of data can then be processed in parallel in various, parallel iterations of multiple functions as processing blocks 315a-315n. For example, a first block of data can be processed by a group of functions in processing block 315a, and another block of data can be processed by the group of functions in another processing block 315b-315n executed in parallel with the processing block 315a. A plurality of processing blocks 315a-315n may be executed in parallel, and is not limited to two such processing blocks. The overlap in the blocks of data can provide a level of redundancy that is not heavily reliant (or not reliant at all) on state information. The less state information that is needed, the easier it is to process the blocks of data in parallel as opposed to a continuous stream. To indicate that various number of processing blocks 315a-315n may operate in parallel, three paths are depicted with three vertical dots between them indicating that any number of paths can be included, such as, but not limited to, four, five, six, etc.

The term "parallel" is used herein to describe that processing occurs in the processing blocks 315a-315n at the same time. The packets being processed may be of different lengths from one processing block 315a-315n to another, so the processing of packets may have the same rate or speed from one processing block 315a-315n to the next. As noted below, some of the processing bocks 315a-315n may proceed faster or slower than others. Accordingly, the term parallel should not be limited to simultaneous or concurrent processing within the processing blocks 315a-315n.

The method 400 can further include a data combine function 320, similar to the fourth function 308 (FIG. 3), combining the processed data, and a data output function 325, similar to the fifth function 309 (FIG. 3).

In a further example, the adjustable series-parallel or parallel-series arrangement of the various functions of the method 300 provide several methods of implementing feedforward processing to replace feedback loops. This is advantageous as it can increase throughput and avoid bottlenecks caused by delays in feedback processing.

An additional advantage of the series-parallel or parallel-series processing provided by the method 300 and the method 400, is that arranging one or more of desired algorithms within a processing block (e.g., one of the five processing blocks of the method 300), allows the processor 202 to distribute the processing load (e.g., across multiple cores 204) without concern for the speed of a given algorithm within a processing block (e.g., core 204). Thus, each core 204 shares the exact same processing load and eliminates bottle necking issues caused by individual algorithms.

An additional benefit of embodiments of the method 300 can include customizing a specific order of algorithms (e.g., processing blocks) to lower the computational burden within the processor 202. As described below, the overall, multi-stage processing of a given process may be agnostic to the order of multiple sub-processes. Therefore, in some examples, ordering the fourth function 308 may have certain advantages if performed prior to the third function 306.

The method 300 can further implement different variable types for memory bandwidth optimization, such as int8, int16 and floats, for example. This can accelerate certain algorithms (e.g., based on type). In addition, this can provide increased flexibility to maximize memory bandwidth.

Figure 5:
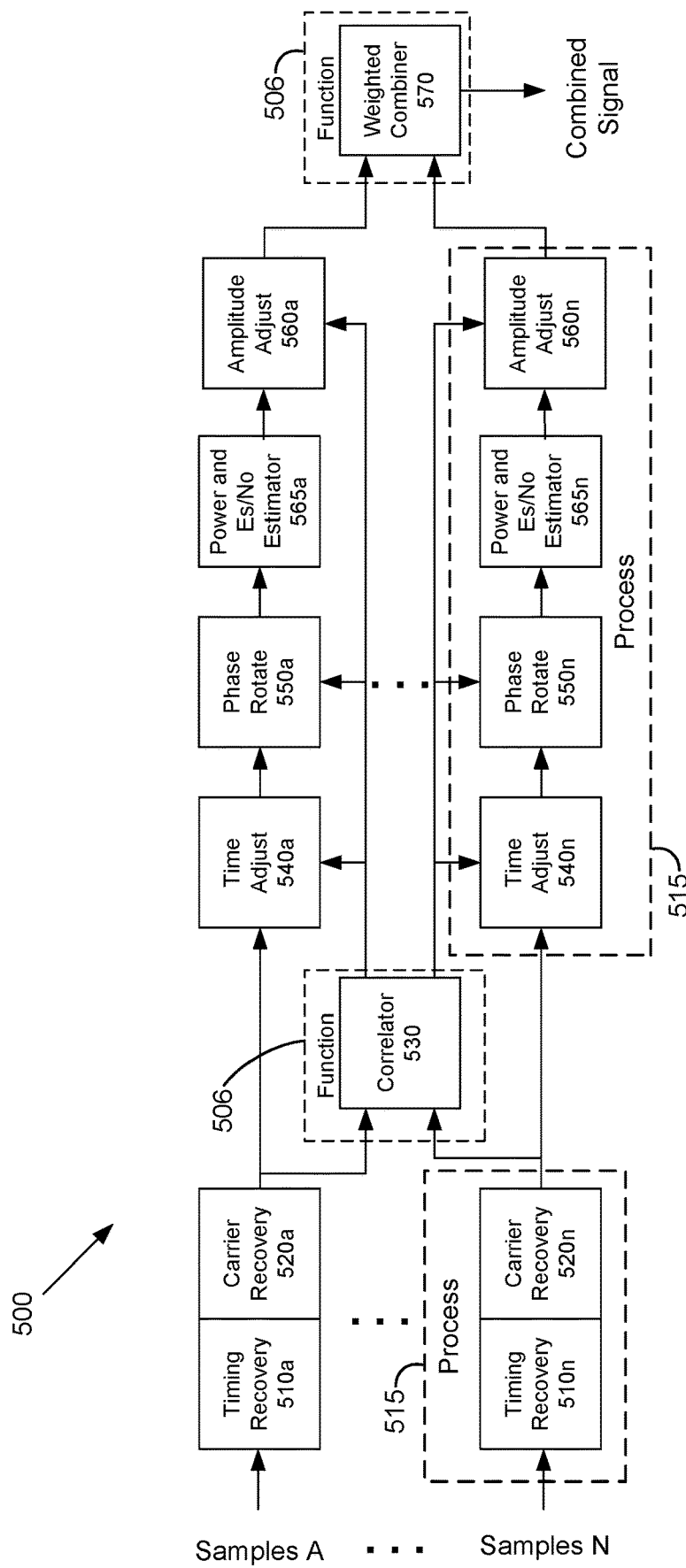
FIG. 5 is a functional block diagram of an example of a digital signal diversity combiner, in accordance with embodiments disclosed herein.
Figure 6:
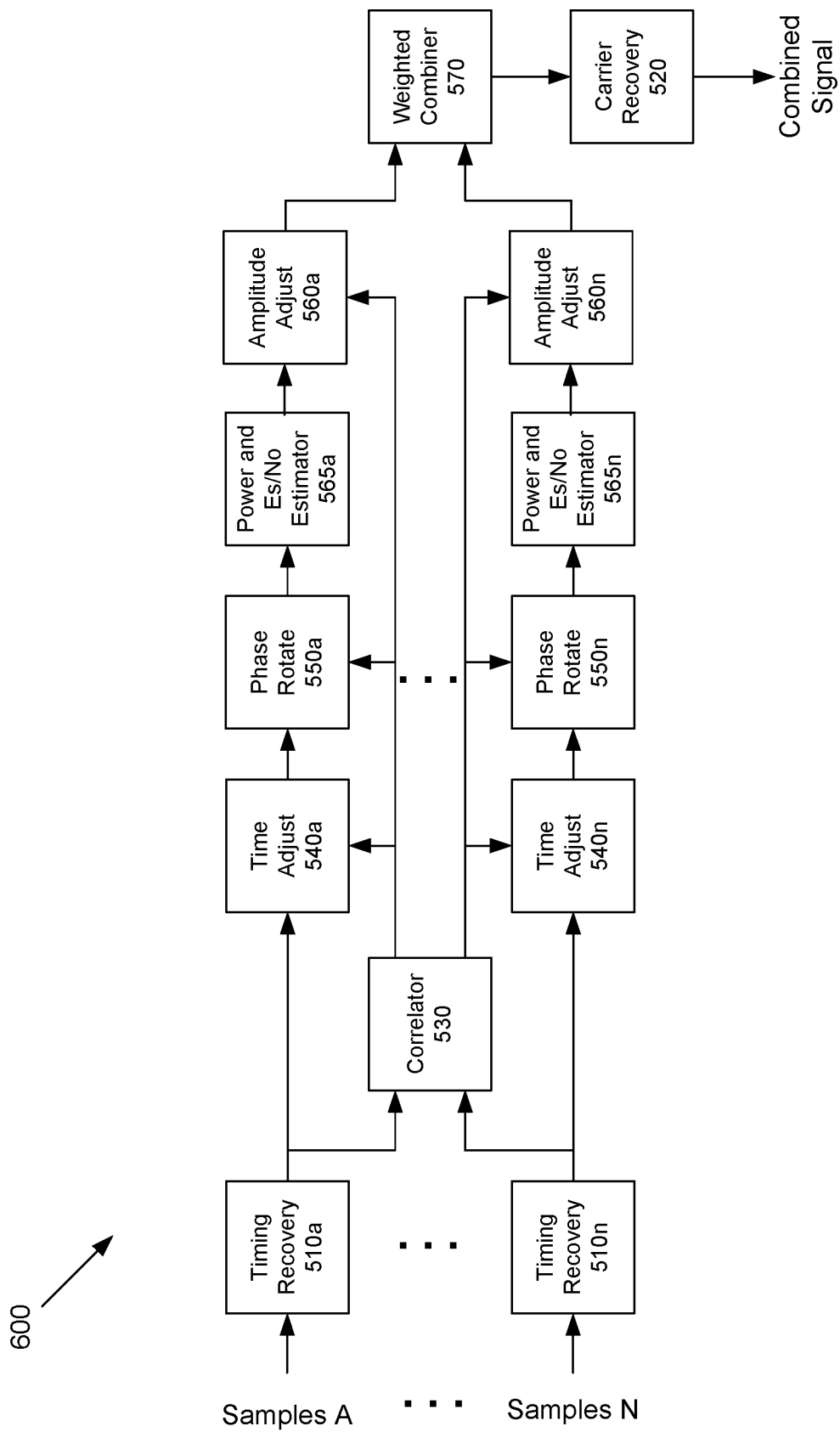
FIG. 6 is a functional block diagram of another example of a digital signal diversity combiner, in accordance with embodiments disclosed herein.

FIGS. 5 and 6 are functional block diagrams of embodiments of digital signal diversity combiners. Methods 500 and/or 600 for diversity combining can include feedforward block processing as described above in connection to FIGS. 3 and 4. The method 500 and/or method 600 may comprise a plurality of blocks. In some examples, each block may represent a function block and perform functions in a similar manner as the function blocks 306a, 306b, . . . 306n (FIG. 3), etc. In another example, two or more of the plurality of blocks of FIGS. 5 and/or 6 can be grouped together as a single "process" 315 that perform functions in a similar manner as the processing blocks 315a, 315b, . . . 315n (FIG. 4), etc.

Figure 9:
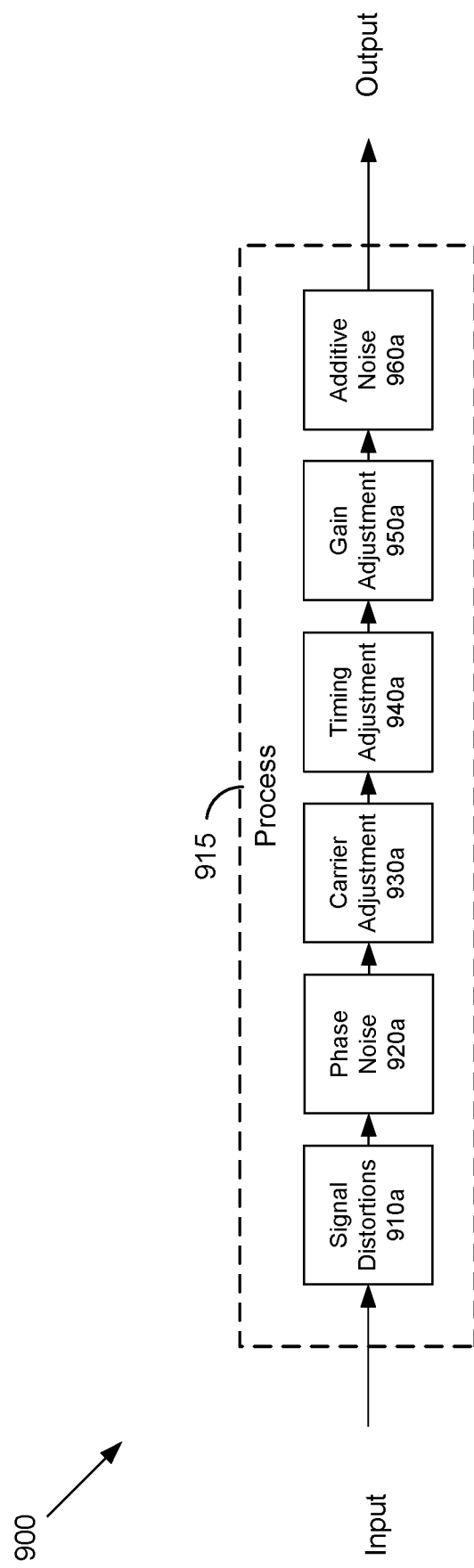
FIG. 9 is a functional block diagram of an example of a channel simulator, in accordance with embodiments disclosed herein.

FIG. 9 is a functional block diagram of an embodiment of channel simulator. Methods 900 for channel simulation can include feedforward block processing as described above in connection to FIGS. 3 and 4. The method 900 comprises a plurality of blocks. In some examples, each block may represent a function block and perform functions in a similar manner as the function blocks 306a, 306b, . . . 306n (FIG. 3), etc. In another example, two or more of the plurality of blocks of FIG. 9 can be grouped together as a single "process" 315 that perform functions in a similar manner as the processing blocks 315a, 315b, . . . 315n (FIG. 4), etc.

Figure 10:
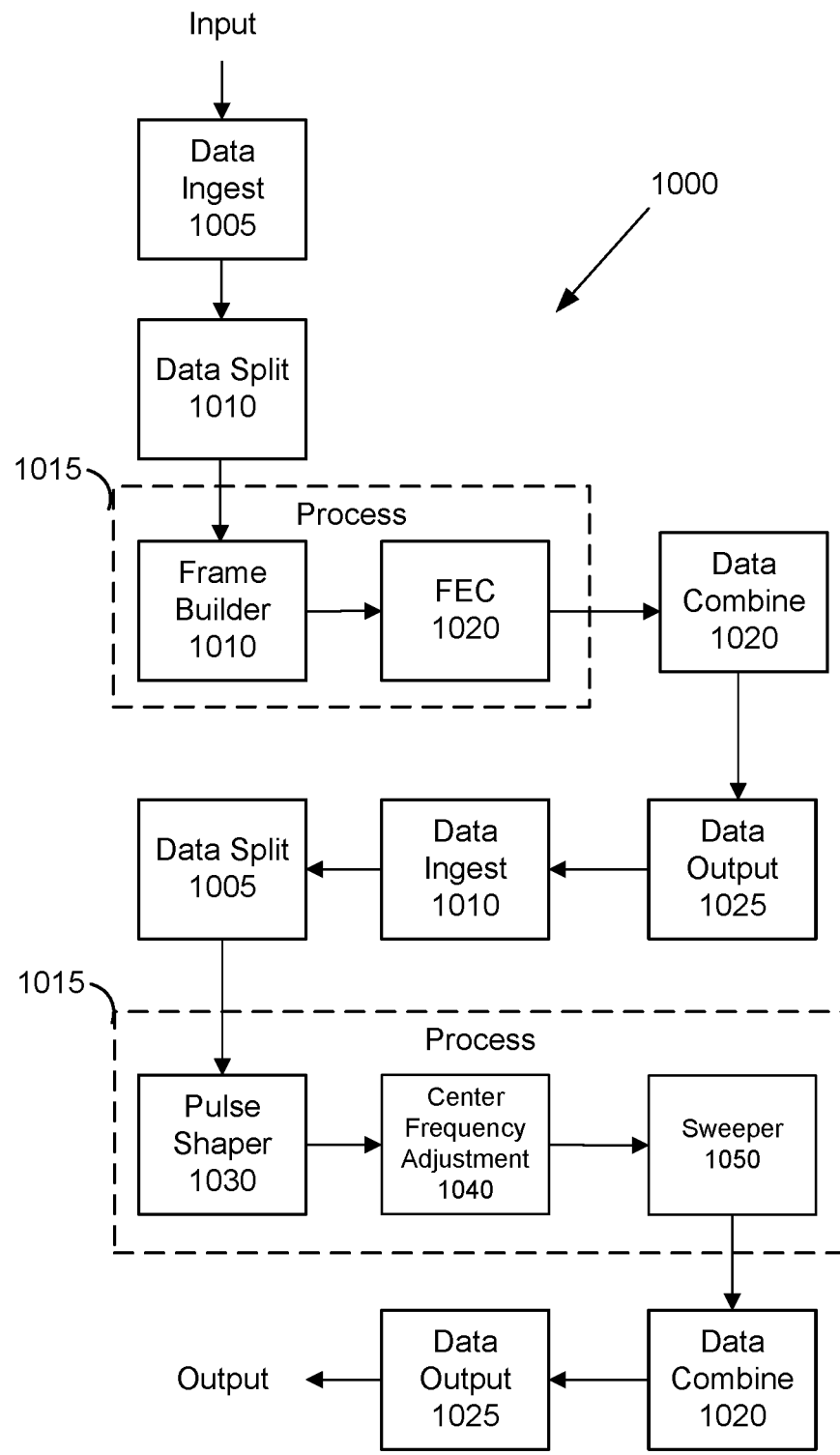
FIG. 10 is a functional block diagram of an example of a signal modulator, in accordance with embodiments disclosed herein.

FIG. 10 is a functional block diagram of an embodiment of signal modulator for waveform generation. Methods 1000 for signal modulation include feedforward block processing as described above in connection to FIGS. 3 and 4. The method 1000 comprises a plurality of blocks. In some examples, each block may represent a function block and perform functions in a similar manner as the function blocks 306a, 306b, 306n (FIG. 3), etc. In another example, two or more of the plurality of blocks of FIG. 10 can be grouped together as a single "process" 315 that perform functions in a similar manner as the processing blocks 315a, 315b, . . . 315n (FIG. 4), etc.

At block 305, the SPS 150 can ingest or otherwise receive the digital bit stream 152 (e.g., via the network 152). The data ingest at block 305 can receive the digital bit stream data from a network connection (e.g., Ethernet).

At block 310, the data can be split into parallel data streams by a data splitter. In some embodiments, the processor 202 can perform data splitting functions required in block 310. In some other embodiments, a separate data splitting component (e.g., a data splitter) can be included in the device 200 (FIG. 2). Splitting the data into multiple parallel streams can allow parallel processing of the downlink signal, such as downlink signals 160, 170. The method 300 can therefore take advantage of feedforward or pre-calculation processing to allow the incoming digitized signal data to be broken into smaller pieces and then processed on multiple cores 204. The digital bit stream 152 can be split to form overlapping packets in in-phase/quadrature (I/Q) pairs. In some embodiments, the "overlapping packets" can include data packets in which successive packets are overlapped with adjacent data packets. In some embodiments the data packets may all be the same length, but overlapped. The overlap in data packets can be at the beginning of the data packet or at the end. In addition, a data packet can overlap with both the preceding and the following data packets. The data packets can also have different lengths (e.g., varying amounts of data). Therefore, a first packet sent to the processing block 315a may overlap or otherwise repeat certain data of a second packet sent to the processing block 315b.

The amount of overlap between packets, or overlap size, can be programmable and set as needed. In some examples, the overlap can be set to one percent (1%) of the packet size. This overlap size can be increased or decreased depending on need. For example, one particular parameter that can impact the overlap size is the uncertainty of the symbol rate in the digital bit stream 152. For most signals, the worst case uncertainty is less than 1%, so a 1% overlap covers most cases. In some other embodiments, the overlap can be 2%, 3%, 4%, 5%, 6%, 7%, 8%, 9%, or as high as 10%, or anywhere in between, as needed. It is also possible to have less than 1% overlap as well. The overlap could be 0.1% or lower if the data rate uncertainty is less than 0.1%.

The processor 202 can implement single instruction, multiple data (SIMD) processing on the digital bit stream 152. In some examples, SIMD can include Advanced Vector Extensions using 512 bits (AVX-512) allowing 16 floating point operations on a single CPU core on a single CPU instruction. AVX-512, for example, can process enormous amounts of data with the CPU (e.g., the CPU 202). For example, the processor 202 (and the device 200) can receive a 500 MHZ bandwidth data stream. 500 MHz of bandwidth is significant in some respects because that is a generally accepted practical limit of a 10 Gigabit Ethernet link. Sampling the data at 500 MHz, with 8 bit samples for an I/Q pair and including parity bits, can saturate a 10 Gbit Ethernet link. The 500 MHz example is not limiting on the disclosure. Data pipes larger than a 10 Gbit Ethernet link are possible. In addition, the processing can be split into n-number of parallel blocks (e.g., block 315) to accommodate any amount of data.

Process 315 is shown in dashed lines and depicts a processing step of the method 300. Process 315 is shown in executed in multiple, parallel steps, or processing blocks 315a, 315b, . . . 315n.

The process 315 as used herein, can refer to a collection of processing functions performed by the processor 202, for example. The digital bit stream 152 can be sent into multiple parallel processing blocks 315a, 315b, . . . 315n to spread the processing load across several cores 204. Individual processing blocks 315a, 315b, . . . 315n can represent individual iterations of cloud processing. Thus, the processing of each of the processing blocks 315a-315n can be associated with a (cloud-based) core 204a-204n. The number of processing blocks 315a-315n needed varies based on the amount of data being processed. In some embodiments, the number of processing blocks 315a-315n can be limited by the number of logical cores available via the network 152 or, for local hardware processing, within the processor 202. In some other embodiments, memory bandwidth constraints can cause a bottle neck in the signal processing. Memory bandwidth can refer to the rate at which data can be read from or stored into a semiconductor memory (e.g., the memory 206) by a processor (e.g., the processor 202).

In some embodiments, the number of processing blocks 315a-315n can vary. In general, the fewer processing blocks 315a-315n present, the better to limit the number of cores needed for the entire process. This can further enable the system to fit into smaller virtual private cloud (VPC) machines which are cheaper to operate. A VPC can include the SPS 150 having several CPUs, for example. In some embodiments, 8 processing blocks 315a-315n can be used for a 10 Gbit Ethernet link. Such an embodiment may not include forward error correction processing blocks. In some other embodiments, the only practical limitation on the number of processing blocks 315a-315n needed is the bitrate and bandwidth of the communication link (e.g., size of the pipe). Accordingly, any number (n) of processing blocks 315a-315n is possible. In some embodiments, however a practical limitation on the number (n) processing blocks 315a-315n may be present based on the number of threads that can be run on a CPU or the number of cores 204 in the processor 202. However, if the limits are reached within a single CPU, multiple CPUs (e.g., the processor 202) together within the SPS 150 (e.g., a VPC) can have an unlimited number of cloud-based CPUs or cores 204 to perform the processing. In addition, the processor 202 can create new processing block 315a-315n as needed. The processing cores 204 can be spread across multiple distributed processors (e.g., the processor 202) as needed for throughput and efficiency.

The processing blocks 315a-315n are arranged in such a way that it does not matter which processing block 315a, 315b, . . . 315n are performed the slowest (or fastest). The method 300 can share the processing load across the processing blocks 315a-315n and therefore alleviate any processing delays caused by bottle necking issues at individual processing blocks 315a-315n. For example, individual subprocesses of the processing blocks 315a-315n (see description of FIG. 4, below) may not be performed or occur at equal rates (e.g., some are faster than others). Accordingly, larger process of the method 400 (FIG. 4), for example, can account for variations in performance or processing times. The processing blocks 315 can then be created as many times as needed to handle the incoming data.

In some embodiments, each processing block 315a-315n can represent a collection of signal processing algorithms performed by the processor 202. As used herein, an algorithm can refer to the smallest collection of functions or method steps that perform a desired function. Multiple exemplary algorithms are described herein.

An exemplary benefit of the method 300 is the ability to create more processing blocks 315a-315n when needed. In general, the processing blocks 315a-315n can be implemented in software, and so can be created or eliminated as needed to suit a given data rate or processing load. Each processing block 315a-315n can be rearranged to fit the needs of different received waveforms (e.g., the downlink signals 160 and/or 170) and the associated digital bit streams 154.

At block 320 the processed signal data from the multiple processing blocks 315 can be recombined to form the original data encoded and modulated on the downlink signal 160, 170. In some embodiments, the processor 202 can perform the functions of a data recombiner. In other embodiments, the device 200 can have an additional component to perform such functions. Each data packet or processed block of data can have a time stamp. The data recombiner (e.g., the processor 202) can order the data blocks based on the time stamps and compare the phase between the ordered blocks. The recombiner can further adjust the phase of adjacent blocks to reorder the data stream. In some embodiments, the phase of a subsequent data block can be adjusted to match the phase of a previous data block.

For all processing blocks shown in process 315, there are at least four options for running:

1) Multiple blocks running, with each sub-element (e.g., each block 315*a*-315*n*) within the processing block 315 getting its own core (e.g., cores 204*a*-204*n*);
2) Multiple blocks running, with the processing block 315 getting just one dedicated core for the entire block;
3) Single block running with each sub-element within the processing block getting its own core; and
4) Single block running with the processing block getting just 1 dedicated core for the entire block.

The more cores that can be run, the higher the rates that may be achievable.

At block 325, the device 200 can output the data to an appropriate receiver. In some examples such a receiver can be one or more mission operations centers. This data can be mission dependent (e.g., the purpose of the satellite), and can include, among other things, weather data, image data, and SATCOM payload data.

In general-purpose CPUs, there are at least three main factors that may limit high rate performance: 1) Data ingest, 2) CPU capacity, and 3) memory bandwidth utilization. Data ingest refers to how fast data can be fed into the CPU. CPU capacity is driven by the CPU clock speed and the number of cores within the CPU. Memory bandwidth refers to how quickly data can be transferred to/from the CPU to external DDR RAM (not CPU cache). Memory bandwidth may be determined by the number of memory lanes and the DDR RAM clock speed. In certain cases, the limiting factor for achieving high rate processing is CPU capacity but in other cases it is memory bandwidth. Care must be taken to determine which of the above cases is impacting the performance and if it is memory bandwidth limited, the embodiments described below are non-limiting examples of ways to lower the memory bandwidth utilization within the proposed patent approach.

Function calls within a given processing block can be arranged in such a manner to optimize CPU computation or memory bandwidth utilization. For example, referring to function calls (illustratively depicted as blocks) shown in FIG. 5, for the given example, the various function calls (e.g., timing recovery block, carrier recovery block, correlator block, time adjust block, phase rotate block, power and Es/No estimator block, amplitude adjust block, and weighted combiner block) can be grouped in such a way to minimize memory bandwidth. These function calls can be called independently so that each function is completed on a set of data before another function starts, so to simplify each function. In another example, a plurality of or all of the function calls can be combined into one block, such that data is not transferred to RAM after each executed function and the memory bandwidth for the combined function is much smaller then called independently. In the case of independently called functions, a first function call (e.g., the timing recovery) may be performed over the whole data set before a second function call (e.g., the correlator) would occur. In the case of combining, just a portion of data would be processed in the first function call before the second is executed. In this way, memory bandwidth drops. This method can apply to any grouping of functions, not just those illustrated in FIG. 5. For example, the method may be applied to the methods shown in FIG. 6 or any other grouping for function calls to be executed in a block as disclosed herein (e.g., the various function call blocks illustrated in FIGS. 7-10).

Another way to improve memory bandwidth utilization may be to collapse several function call blocks into one block similar to the approach described above. For example, as described in greater detail below with reference to FIG. 5, a plurality of functions may be necessary to perform timing and carrier recovery. Normally, for ease of operation and CPU optimization, each function would require its own block, but to lower memory bandwidth utilization, all functions can be combined into one processing block. This tradeoff lowers memory bandwidth utilization for a hit in CPU performance.

Digital Signal Post-Detection Diversity Combiner Running on General Purpose CPUs Employing Parallel Processing on Multiple Cores to Achieve High Through-Put Operating in a Cloud Environment:

As described above, FIGS. 5 and 6 are functional block diagrams of example implementations of methods 500 and 600. In various examples, each of methods 500 and 600 may be an example of a Diversity Combiner method. To indicate that various number of signals may be processed in parallel, two paths are depicted with three vertical dots between them indicating that any number of paths can be used such as four, eight, etc. Diversity combining may be used to combine multiple antenna feeds together such that the signals all are aligned in time and phase, and weighted based on signal quality to optimize combined information transfer on the multiple input signals A through N. Signal quality may be determined using, for example but not limited to, one or more of signal-to-noise ratio, energy per symbol to noise power spectral density (Es/No), power estimates, received signal strength indicators (RSSI), and the like. The multiple antenna feeds can be from one or more remote locations, such as the platform 110 or the satellite 111. Satellites are used as an example herein, but other wireless transmission systems may be implemented such as radio antennas (e.g., the antenna 122) or other type of transmitter. Accordingly, the use of a satellite is not limiting on this disclosure.

In the case of a satellite as shown in FIG. 1, the diversity combining can also be used during an antenna handover event when the platform 110 and the satellite 111 are visible from the same ground station (e.g., the ground station 122) but, for example, the satellite 111 is falling below the horizon (e.g., in the east) and the platform 110 is rising over the horizon (e.g., in the west). In order to properly combine the downlink signals, several calculations must be performed. The disclosed system can digitize and convert the signals into digital samples which are then transported to a signal processing element. The system can further compute and compensate for Doppler effects. The system can also determine the residual phase and frequency delta (e.g., difference) between the downlink signals as well as the time differential and the estimated signal-to-noise ratios of each signal. Following these operations, the signals are then combined together.

There are many approaches that may be used to combine signals. For example, signals may be combined using a Pre-Detect (Pre-D) Diversity Combiner and/or a Post-Detect (Post-D) Diversity Combiner. Pre-D Diversity Combiners may be configured to combine signals before executing a match filter (e.g., also referred to as detector). An example implementation of a Pre-D Diversity Combiner is described in PCT/US2020/65351, the disclosure of which is incorporated by reference herein in its entirety. Post-D Diversity combiners may be configured to combine signals after completion of a match filter function. As such, Post-D Diversity combiners may offer simplified methods for performing diversity combining over the Pre-D methods since the signals and data packets are discrete digital samples. Thus, the functions and complexity may be reduced as compared to the Pre-D Diversity Combiners. For example, Post-D may be simpler since execution comes after the match filter and combination occurs in symbol space. This means, the time adjustment may be done in only one whole symbols steps, and sub-sample adjustment is unneeded, which is not the case for Pre-D.

Implementations of Post-D Diversity Combiners may include Post-D End (referred to herein as Post-DE, an illustrative example of which is shown in FIG. 5) and Post-D Mid (referred to herein as Post-DM, an illustrative example of which is shown in FIG. 6). As used herein, Post-DE may refer to a combiner where the signal is combined after a match filter is executed, for example, after executing full demodulation, including carrier and timing recovery. That is, combining in the Post-DE method occurs after both the timing recovery and the carrier recovery are locked. As used herein, the term "locked" refers to a correct demodulation of signals in which proper timing and/or carrier alignment is achieved via timing recovery and/or carrier recovery, respectively. As used herein, Post-DM may refer to a combiner where input signals are combined after partial execution of the full demodulation process, for example, after timing recovery of the demodulation processing chain and a match filer but before carrier recovery of the demodulation processing chain. Thus, the Post-DM method allows for combining after the timing recovery is locked, but before carrier recovery. An example of a non-limiting benefit of the Post-DM is that the combined signal can achieve a higher Es/No and/or signal-to-noise ratio (SNR) before carrier recovery is executed. Since carrier recovery may fail at higher Es/Nos than timing recovery, the Post-DM method may improve the entire system's Es/No sensitivity. However, the Post-DM method may include an increased complexity cost in execution. Whereas, the Post-DE method may be simpler to set up and execute, but carrier recovery may need to be locked prior to combining, which usually is a limiting factor to receiver sensitivity. This limits how low in terms of Es/No and/or SNR the diversity combiner can operate and may limit its usefulness for power Forward Error Correction (FECs) like those used in some waveform standards, such as DVB-S2.

The Post-DM and Post-DE methods disclosed herein illustrate two possible high-level examples for Post-D Diversity Combiner methods. It will be appreciated that the embodiments herein are not limited to only these two methods. Other methods are possible.

FIG. 5 illustrates an example Post-DE Diversity Combiner as method 500. As shown in FIG. 5, method 500 receives input samples from multiple antenna feeds (e.g., downlink signals 160 and/or 170 are received and sampled at the antenna and feed into method 500), combines the inputs together, and outputs a combined signal such that the signals are aligned in time and phase, and weighted based on signal quality to optimize combined information transfer on the multiple signals. Method 500 may be executed by a processor (e.g., processor 202 of FIG. 2), for example, implemented as the SPS 150 of FIG. 1.

The method 500 comprises a plurality of function blocks, for example, a plurality of timing recovery blocks 510a-510n (collectively referred to as timing recovery block(s) 510 or block(s) 510), a plurality of carrier recovery block 520a-520n (collectively referred to as carrier recovery block(s) 520 or block(s) 520), one or more correlator block(s) 530, a plurality of time adjust blocks 540a-540n (collectively referred to as time adjust block(s) 540 or block(s) 540), a plurality of phase rotate blocks 550a-550n (collectively referred to as phase rotate block(s) 550 or block(s) 550), a plurality of amplitude adjust blocks 560a-560n (collectively referred to as amplitude adjust block(s) 560 or block(s) 560), a plurality of power and Es/No estimator blocks 565a-540n (collectively referred to as power and Es/No estimator block(s) 565 or block(s) 565) and one or more combiner block(s) 570. In the illustrated example, a plurality of blocks 510a-510n, blocks 520a-520n, blocks, 540a-540n, blocks, 550a-550n, blocks, 560a-560n, and 565a-565n are shown for executing functions on samples of a plurality of downlink signals received via a plurality of antenna feeds, where each block is executed on a corresponding signal. Any number of signals are possible; however, the example herein will be described with reference to two signals (e.g., sample A and sample N).

In the illustrative example of FIG. 5, a given timing recovery block 510 and corresponding carrier recovery block 520 may be part the full demodulation process, including a match filter for a respective input signal. For example, block 510a and 520a may be part of the full demodulation process of signal A, while block 510n and 520n may be part of a the full demodulation process of signal N. Each respective block 510 and block 520 may be configured to demodulate a respective input signal and may be referred to herein as a demodulator processing chain. Thus, the Post-DE method shown in FIG. 5 is configured to combine input signals at the end (e.g., following execution of) the demodulator chain. As such, the combiner logic is after the full demodulation, but before forward error correction.

As described above, the plurality of blocks of method 500 may each represent a function and may be implemented as one or more of the function 306a, 306b, . . . 306n (FIG. 3). For example, as shown in the illustrative implementation of FIG. 5, the correlator block 530 may be implemented as function 306 of FIG. 3, such data from the carrier recovery blocks 520a-520n may be split into blocks of data and processed in parallel functions 306a-306n. Similarly, as shown in FIG. 5, the combiner block 570 may be implemented as function 306 and executed as a plurality of functions 306a-306n to process a plurality of blocks of data in parallel. While specific examples of blocks are shown implemented as functions 306, these example as not intended to be limited and any blocks of method 500 may be implemented as function 306.

In another example, alone or in combination, a plurality of blocks shown in FIG. 5 can be grouped together as a single "processing" 515 that perform functions in a similar manner to the process 315 of FIG. 4. That is, a plurality of blocks of FIG. 5 may be grouped together as process 515 and executed in multiple, parallel iterations as processing blocks 315a, 315b, . . . 315n (FIG. 4). For example, different portions of the method 500 can be grouped together as a processing 515 and run in series-parallel and/or parallel-series processing as described above in connection to FIG. 4. In the illustrative example shown in FIG. 5, the timing recovery block 510n and carrier recovery block 520n for executing a match filter along the processing path of signal N are grouped as a processing 515. In this case, with reference to FIG. 4, the input samples may be ingested at block 305, split into overlapping blocks of sample at block 310, and each overlapping block of data may be processed in multiple, parallel iterations of timing recovery blocks 510n and carrier recovery blocks 520n as processing blocks 315a-315n. The processed overlapping data blocks are then output to the data combine 320 for combining the processed data and then output by block 325 for processing by a subsequent block of method 500. Data combine block 320 of FIG. 4 is not to be confused with the combiner block 570. Block 320 combines the parallel block processing of 315a-315n, whereas combiner block 570 executes diversity combining, as described below. Similarly, as illustratively depicted in FIG. 5, the time adjust block 540n, phase rotate block 550n, and power and Es/No estimator block 565, and amplitude adjust block 560n are shown grouped as a processing block 315.

While specific examples of blocks are shown grouped together as a process 515, these examples are not intended to be limited and any grouping of one or more blocks of method 500 may be grouped together as processing 515 and executed in parallel as described in connection with FIG. 4. For example, one or more of time adjust block 540n, phase rotate block 550n, and amplitude adjust block 560n may be executed as processing block 315.

Furthermore, while only portions of the path corresponding to the input from signal N input are shown in FIG. 5 as being grouped together, it will be understood that various blocks for the signal A path can also be grouped together as a process 515 and executed in parallel. For example, blocks 510a and 520b may be grouped as a first process 515 and blocks 540a-565n grouped together as a second process 515. Other groupings are possible as noted above.

In various examples, the plurality of blocks of FIG. 5 may be implemented using SIMD processing techniques as described throughout the present disclosure. SIMD techniques may offer increased throughput and minimized memory bandwidth requirements. Increasing the functionality of each processing block executed using SIMD techniques may serve to provide increased minimization of memory bandwidth requirements.

At blocks 510 and 520, the processor 202 (e.g., one or more cores 204) can perform timing and carrier recovery on respective input samples from downlink from respective antenna feeds. An example of a timing and carrier recovery method is illustratively shown in FIGS. 7 and 8.

Figure 7:
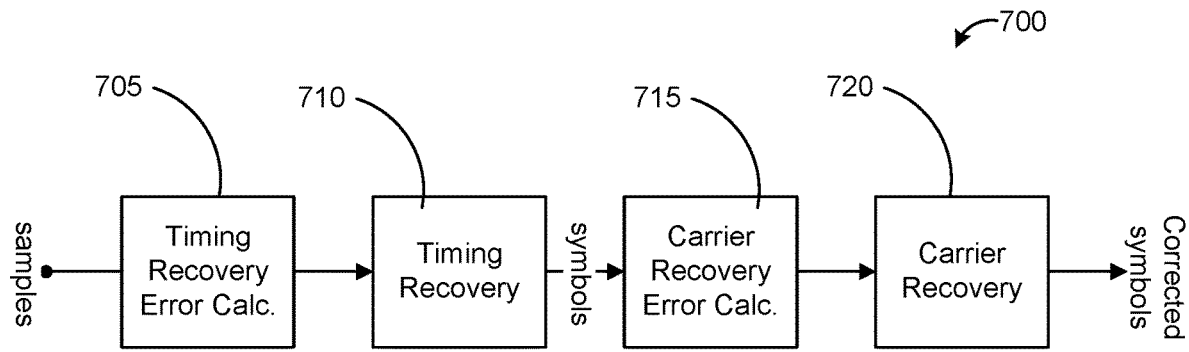
FIG. 7 is a functional block diagram of an example of a method of timing and carrier recovery, in accordance with embodiments disclosed herein.

FIG. 7 is a flowchart of an example of a method for timing and carrier recovery implemented by the signal processing method of FIG. 3 and/or FIG. 4. FIG. 7 illustrates method 700 comprising a plurality of blocks, one or more of which may be implemented as a process 315 such that the groupings of blocks are processed in each of processing blocks 315a-315n of FIG. 4. Each of the blocks of method 700 may also each be implemented as a function 306 such that a single block can be executed across functions 306a-306n of FIG. 3. Execution of a block according to FIG. 3 may be performed separately or in combination with execution of a process according to FIG. 4.

The method 700 can be used for standard waveform processing as opposed to offset waveforms described below. For example, standard waveform processing can be used for waveforms that map bits into symbols and then modulate the symbols onto a carrier wave. Examples of standard waveforms include binary phase shift keying (BPSK), quadrature phase shift keying (QPSK), 8PSK, 16APSK, 32APSK and 64 APSK as well as quadrature amplitude modulation (QAM) waveforms. The method 700 may be an illustrative example timing recovery processing block 510 and an example carrier recovery block 520 of FIG. 5.

At block 705, the processor 202 (e.g., one or more of the cores 204) can perform a timing recovery error calculation on the received data packets (e.g., samples of the digitized bitstream 154 or the digitized downlink signal 160 and/or 170). The timing recovery error calculation can provide the needed phase information to properly align a matched filter to the incoming data stream (e.g., the digitized bit stream 134). The match filter is used to match the transmitted waveform in the time domain and is aligned by the timing error to capture all the energy in the received signal to optimize performance. The results of the timing recovery error calculation can include three parameters: 1) starting phase in degrees; 2) frequency adjustment in Hertz (Hz); and 3) Doppler rate adjustment in Hz/sec. The foregoing units are exemplary and are not limiting on the disclosure. Other equivalent units are also possible.

At block 710, the processor 202 (e.g., one of the cores 204) can perform a timing recovery on the packets to align an internally generated match filter to the received samples that were generated with the modulator's respective match filter. The alignment is based on the calculation in block 705. The output of block 710 is the synchronized (e.g., time-corrected) symbols within the data packets received at block 705.

Examples of the Timing Recovery Error Calc block 705 and Timing Recovery block 710 are described in U.S. Pat. No. 10,790,920, the disclosure of which is hereby incorporated herein by reference as if set forth in full. For example, an estimated Gardner Timing Error Detector can be applied to incoming data to create timing information, as is known in the art. In another embodiment, the incoming sample stream can be delayed by one sample. Then the non-delayed data can be multiplied by the conjugate (conjugate multiplication) of the delayed data. Both have advantages and drawbacks so it is an tradeoff on which to implement. Timing spikes, generated by the Gardner Timing Error Detector, can be mixed with a timing estimate or an estimate of the symbol rate; the mixed signal may be decimated to reduce the sampling rate; a phase unwrap calculation may be performed on the decimated samples; and a curve fit calculation may be performed to determine phase, frequency, and Doppler rate offset information that can be applied to update the timing estimate.

At block 715, the processor 202 (e.g., one of the cores 204) can perform a carrier recovery error calculation on the packets to determine phase and frequency information.

At block 720, the processor 202 (e.g., one of the cores 204) can perform a carrier recovery on the packets based on the calculation in block 715. Carrier recovery compensates for unknown frequency, Doppler rate, and phase offsets in the downlink signal (e.g., downlink signals 160 and/or 170) from the spacecraft (e.g., the satellite 110). The two most common sources of uncertainty are the Doppler effects from the spacecraft motion and from imperfect oscillators within the spacecraft. The processor 202 can apply the phase, frequency, and Doppler rate corrections from block 715 to form a synchronous symbol corresponding to the modulated data in the downlink signal (e.g., downlink signals 160 and/or 170) at the output of block 720.

Examples of the Carrier Recovery Error Calc block 715 and Carrier Recovery block 720 are also described in U.S. Pat. No. 10,790,920, the disclosure of which is hereby incorporated herein by reference as if set forth in full. For example, an incoming signal can be raised to certain power based on modulation type; the mixed signal can be decimated to reduce the sampling rate; a phase unwrap calculation can be performed on the decimated samples; a curve fit calculation can be performed to determine phase, frequency, and Doppler rate offset information that can be applied to update the carrier recovery algorithm; and the curve fit can be used to update (and improve) the carrier frequency estimate.

In some implementations, blocks 705 and 710 may be grouped together as a single processing block, for example, as shown in FIG. 5 as timing recovery processing block 510. Similarly, in some implementations, blocks 715 and 720 may be grouped together as a single processing block, for example, as shown in FIG. 5 as carrier recovery processing block 520. In some implementations, one or more additional processing blocks may be executed between blocks 710 and 705, for example, as illustrated in FIG. 6.

Furthermore, the timing recovery error calculation 705 and the timing recovery block 710 may be grouped together as a process 315 of FIG. 4. In the case where timing recovery is performed across multiple processing blocks 315a-315n, the signal may be combined via block 320 prior to execution of the grouped blocks (e.g., process 315) and output by block 325 of FIG. 4 as a single thread operation for each signal. While blocks 305, 310, 320, and 325 are not illustrated in FIG. 7, it will be understood that such blocks may be present such that input data into a process may be ingested (305) and split (310) to perform the grouped functions as processing blocks 315a-315n and that the resulting processed data may then be combined (320) and output (325) for downstream processing. The output signal is now in symbol space, as shown in FIG. 7, and downstream functions may be executed on resulting output symbols. The more processing blocks executed, the higher processing rate that can be achieved and throughput can be increased.

After converting from the sample space to the symbol space at block 710, the signal symbols may be corrected by blocks 715 and 720. The blocks 715 and 720 may be grouped together as a process 315 of FIG. 4. Thus, symbols output from the block 710 may be fed again into a carrier recovery process 315 and executed across processing blocks 315a-315n, where the block 710 is implemented as a separate process and/or function from block 715, for example, as described above.

As another example, each of the blocks 705-720 may be grouped as a single processing block 315 and executed across processing blocks 315a-315n of FIG. 4, for example, as described above in connection to FIG. 5. Furthermore, each block 705-720 may be implemented as function 306 and executed across the cores 204 as functions 306a-306n.

Figure 8:
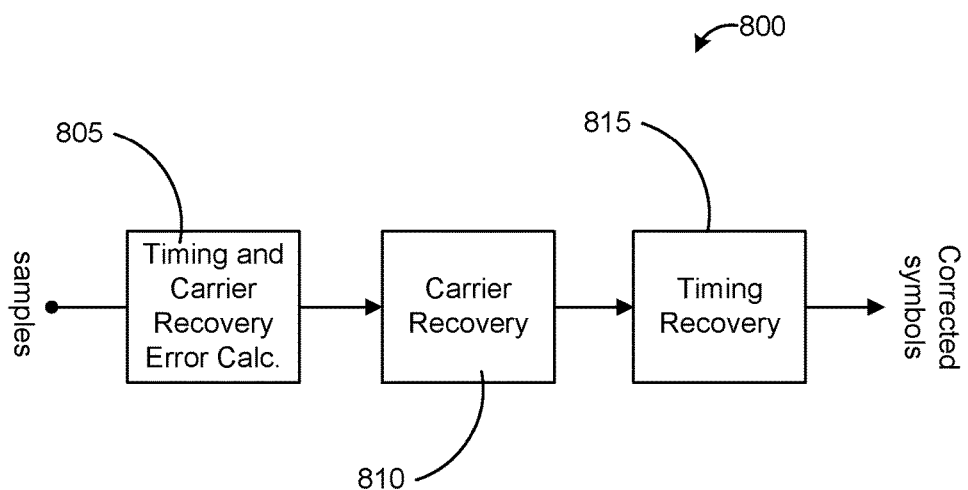
FIG. 8 is a functional block diagram of another example of a method of timing and carrier recovery, in accordance with embodiments disclosed herein.

FIG. 8 is a flowchart of an embodiment of another method for timing and carrier recovery implemented by the signal processing method of FIG. 3/FIG. 4 (the processes that occur in each of blocks 315a-315n). FIG. 8 illustrates another method 800 which may be similar to the method 700 (FIG. 7), combining and rearranging some of the functional blocks. As with method 700, the method 800 can be used for offset waveform processing. For example, offset waveform processing can be used for waveforms having an offset or stagger between the In-phase (I) and Quadrature (Q) channels, such as waveforms like Offset quadrature phase-shift keying (OQPSK), minimum-shift keying (MSK), Gaussian minimum-shift keying (GMSK), and shaped-offset quadrature phase shift (SOQPSK).

At block 805, the processor 202 (e.g., one or more cores 204) can perform a timing and carrier recovery error calculation on the packets. The timing recovery error calculation and the carrier recovery error calculation are similar to those performed in blocks 705 and 715 (FIG. 7). In the method 800 though, the carrier recovery is performed before timing recovery of the symbols. The input to the method 800 is the samples and the output is corrected, synchronous symbols.

At block 810, the processor 202 (e.g., one or more cores 204) can perform a carrier recovery operation based on the calculation from block 805. An example of the Timing and Carrier Recovery Error Calc block 810 is also described in U.S. Pat. No. 10,790,920, the disclosure of which is hereby incorporated herein by reference as if set forth in full. For example, a digitized bit stream can be squared, which can result in spikes being created in the frequency domain. Each spike can then be mixed by a mix signal created from a composite estimate of the carrier frequency and symbol rate. Both mixed signals may then be decimated to reduce the sampling rate; a phase unwrap calculation may be performed on both mixed signals; a curve-fit calculation may be performed; and the result passed onto the carrier recovery and timing recovery algorithms to update the information.

Referring back to FIG. 5, corrected symbols for each input signal output from respective blocks 520a-520n are fed to block 530. At block 530, the processor 202 (e.g., one or more cores 204) may calculate time and phase relationships between input signals (two input signals in this example). For example, the block 530 may perform a correlator function using a fast Fourier Transform (FFT) on the corrected symbols, which can output both time and phase information indicating respective offsets or stagger between the input signals from the same operation. Once a coarse correlation is run using an FFT, a fine correlation can be run over a smaller set of data to ensure time and phase alignment have not changed.

Coarse correlation may refer to running timing and phase differences between the two signals over many symbols to determine the time uncertainty between the two signals. For the case with a single satellite and two antennas, this time is usually small (e.g. micro-seconds or less) and may vary based on cable lengths and analog equipment timing differences. For rates less than 1Msymbols/second (Msps), coarse timing estimation may need only to cover +/−1 symbol. If the symbol rate is 100 Msps, coarse timing estimation may need to cover +/−100 symbols. If the scenario is antenna handover, for example, where there are two satellites and two antennas, the timing difference between the two signals could be 100 milliseconds or greater. For 1 Msps, coarse timing estimation may need to cover at least +/−100k symbols in coarse timing estimation. And for 100 Msps, coarse timing estimation may need to cover 10M symbols. Fine correlation may be needed to run over at least 1 symbol, but may be ran over 3 to 15 to ensure the timing alignment is not lost once found by coarse correlation. For each acquisition mode, once timing is known, it is possible to find the phase difference between the two signals by either comparing the phase of the FFT result as is the case of coarse correlation, or the phase of properly time aligned correlator for the case of fine correlation.

At block 540, timing information from block 520 is fed to block 540 and the processor 202 (e.g., one or more cores 204) and adjusts the timing of the input signals based on the timing information. Since the signal has already been properly demodulated and passed through a matched filter and is now just symbols, time alignment is straight forward since only integer number of symbol delay needs to be applied instead of fractional samples as is the case for Pre-D combining. Block 540 may apply a delay based on the timing offset between the input signals as calculated in block 530 for proper alignment therebetween. That is, for example, a delay corresponding to the timing offset between input signal A and input signal N is applied such that the symbols of the respective signals are aligned in the time domain. For example, block 520 may calculate time relationships for aligning the symbol streams from blocks 520a-520n so that each symbol from one signal chain matches symbols in other symbol chains in terms of symbol order. For example, for the case with a single satellite (e.g., satellite 111 or platform 110) and two antennas (e.g., antennas 122, 132, and/or 142), it is possible to label each symbol from the satellite transmitter with a number that corresponds to every symbol transmitted. The correlator 530 determines that first symbol would be symbol 1, and the 100th symbol will be symbol 100 and so on. The time adjust block 540 then makes sure to align symbol 1 from signal A to symbol 1 from signal N.

Phase offset information calculated at block 530 is fed to block 540 and, at block 540, the processor 202 (e.g., one or more cores 204) rotates the phase of at least one input signal to align the phase of the signals. Block 550 may remove Doppler effects by rotating one of the signals to properly align with the other signal(s) based on the phase offset information from block 530. This operation can be achieved using a complex multiply, as is known in the art, In some cases, if the phase change is +/−90 or 180 degrees, a combination of swapping and/or inverting of in-phase (I) and Quadrature (Q) channels may be performed, as is known in the art. As an illustrative example, the phase of a first signal A must be properly adjusted to match the phase of the signal N. For example, for QPSK, there are four possible phases that are possible for each symbol. Since the demodulator does not guarantee how these four phase possibilities line up after demodulation, one of the signals phases must be adjusted to match the other. The block 530 calculates this adjustment amount. For example, say the phase of signal A of symbol 1 is 45 degrees and the phase of signal N of symbol 1 is 135 degrees. The block 530 determines that signal N needs to be adjusted by negative 90 degrees so that symbol 1 of signal N (and all other symbols) line up with that of signal N and this information is passed to block 550 to rotate the phase of the signal accordingly.

At block 565, the processor 202 (e.g., one or more cores 204) estimates signal power and Es/No for each input signal. At block 565, the Es/No may be measured using any one of several approaches. One illustrative example for measuring Es/No is to calculate (C/N)×(B/fs), where C/N is one of the carrier-to-noise ratio or signal-to-noise ratio, B is the channel bandwidth in hertz, and fs is the symbol rate or symbols per second. However, it will be appreciated that any approach for measuring Es/No will be equally applicable to the embodiments disclosed herein. In another example, block 565 may estimate signal quality, for example, signal-to-noise ratio, power estimates, received signal strength indicators (RSSI), and the like. These estimates may be fed to block 570 to weigh each input signal appropriately for combining.

The power and Es/No estimates from block 565 may be fed to block 560 along amplitude information indicating differences in signal amplitude from block 530. As another example, the amplitude information can be applied by the demodulation process (e.g., blocks 510 and 520) directly, because these blocks may include an automatic gain control (AGC) loop. In either case, at block 560, the processor 202 (e.g., one or more core 204) adjusts the amplitude of each respective signal by, for example, multiplying the amplitude of the input signal based on the provided estimated power and Es/No from block 565. For subsequent combining, the signals A-N are weighted by the difference in Es/No between the each. For example, if both signals have the same Es/No, a 50/50 weighting may be applied, where each signal is scaled by 0.5 (or weighted by 50%) before combining. If the Es/No difference between signals is 3 dB, a weight of 66/34 may be applied, where the higher Es/No signal is scaled by 0.66 (or weighted by 66%) and the lower Es/No is scaled by 0.34 (or weighted by 34%) before combining.

Once the signals have been time and phase aligned and the amplitude adjusted as set forth above, at block 570 the processor 202 (e.g., one or more processors 204) may apply scaling based on Es/No estimates and power estimates calculated in block 565. For example, a signal having a better signal-to-noise ratio as compared to another signal may be assigned a higher weight than the other signal and scaled accordingly. Similarly, higher Es/No estimates and/or power estimates may be assigned greater weights and scaled accordingly. SIMD techniques may be employed to efficiently scale and combine the multiple signals (e.g., two signals in this example). Block 570 may sum the signals after all the adjustments have been made.

While the blocks 540, 550, and 560 are illustratively executed in a particular order, it will be appreciated that the embodiments herein are not limited to only the illustrated order. Blocks 540, 550, and 560 may be executed in any order as desired and/or executed in parallel.

FIG. 6 illustrates an example Post-DM Diversity Combiner as method 600. As shown in FIG. 6, the method 600 receives input samples from multiple antenna feeds, combines the inputs together, and outputs a combined signal in a manner substantially similar to that of FIG. 5.

The method 600 comprises the same blocks as those in method 5 that are configured to execute substantially the same functions, but are executed in the order as shown in FIG. 6. For example, method 600 comprises the timing recovery blocks 510, the carrier recovery blocks 520, the one or more correlator block(s) 530, the time adjust blocks 540a, the phase rotate blocks 550, the amplitude adjust blocks 560, and the one or more combiner block(s) 570. As with method 500, method 600 includes the plurality of blocks 510a-510n, blocks, 540a-540n, blocks, 550a-550n, blocks 565a-565n, and blocks 560a-560n for executing functions on sample of a plurality of signals received via a plurality of input antenna feeds, where each block is executed on a corresponding signal. Any number of signals are possible; however, the example herein will be described with reference to two signals.

Where method 600 deviates from that of method 500 is that the input signals are combined after performing timing recovery at blocks 510 but before executing the carrier recovery at block 520 of the demodulator processing chain. Therefore, combining occurs mid-demodulation. For example, as shown in FIG. 6, the carrier recovery block 520 is executed on the combined signal out from the combiner block 570.

As described above in connection to FIG. 5, the plurality of blocks of method 600 may each represent a function 306 and may be executed in parallel as one or more of the functions 306a, 306b, . . . 306n (FIG. 3). That is, for example, the correlator block 530 of FIG. 6, the weighted combiner block 570 of FIG. 6, etc. may be executed in parallel as one or more functions 306a-306n. Similarly, a plurality of blocks shown in FIG. 6 can be grouped together as a single "processing" (e.g., process 515 and/or 315) that performs functions in a similar manner as the processing blocks 315a, 315b, . . . 315n (FIG. 4). That is, for example, for a given signal processing chain the timing recovery block 510 may be grouped as process 515 (e.g., timing recovery error calculation block 705 and timing recovery block 710), while the blocks 540-565 may be grouped together as another process 515. Similarly, blocks 570 and 520 of FIG. 6 may be grouped together as still another process 515. Various other combinations are possible. Furthermore, the plurality of blocks of FIG. 6 may be implemented using SIMD processing techniques as described throughout the present disclosure.

While FIGS. 5 and 6 illustrate two possible high-level examples for Post-D Diversity Combiner methods, it will be appreciated that the embodiments herein are not limited to only these two methods and that other methods are possible.

That is, embodiments herein provide for methods of executing any function of a diversity combiner as a function 306 to be executed in parallel as functions 306a-306n (FIG. 3) and/or grouping one or more functions of a diversity combiner as a process 315 to be executed in parallel as processing blocks 315a-315n.

Channel Simulator Running on General Purpose CPUs Employing Parallel Processing on Multiple Cores to Achieve High Through-Put Operating in a Cloud Environment:

As described above, FIG. 9 is a functional block diagram of an example implementation of method 900. In various examples, method 900 may be an example of a channel simulation method. A channel simulator is used to simulate one or more different distortions and/or effects of a moving transmitter and/or a receiver in a radio environment. For example, with reference to FIG. 1, embodiments of the channel simulator may be used to simulate a transmitter on satellite 111 and/or platform 110 (e.g., an airplane, helicopter, or unmanned aerial vehicle (UAV), etc.) that is moving through the environment relative to a receiver (e.g., one or more of antenna 122, 132, and 142). As another example, embodiments of the channel simulator may be used to simulate a receiver on satellite 111 and/or platform 110 (e.g., an airplane, helicopter, or unmanned aerial vehicle (UAV), etc.) that is moving through the environment relative to a transmitter (e.g., one or more of antenna 122, 132, and 142). In yet another example, embodiments of the channel simulator may be used to simulate a transmitter on satellite 111 and/or platform 110 (e.g., an airplane, helicopter, or unmanned aerial vehicle (UAV), etc.) that is moving through the environment relative to a receiver on satellite 111 and/or platform 110 (e.g., an airplane, helicopter, or unmanned aerial vehicle (UAV), etc.)

The channel simulator method simulates at least one or more of and possibly all of the possible effects of the above described environment, either from imperfect transmitters, environmental effects or moving vehicles. Possible transmitter impairments that can be simulated include, but are not limited to, phase noise, non-linear distortions (AM-PM), in-phase/quadrature (I/Q) imbalance, imperfect match filters, timing jitter, and the like. Possible environmental effects include, but are not limited to, rain fade, scintillation, multi-path, and the like. Possible motion effects include, but are not limited to, the adjustment on the center frequency of the signal, adjustment in time delay, power adjustments. A channel simulator can also add Additive White Gaussian Noise (AWGN) or any other kind of noise that channel may impart on a signal.

FIG. 9 illustrates an example channel simulator as method 900. To simulate all the needed channel effects, method 900 may include one or more functional blocks 910-960 for the several operations to be performed on the signal. For example, in the illustrative example of FIG. 9, the method 900 includes one or more of a signal distortions block 910, phase noise block 920, center frequency adjustment block 930, timing adjustment block 940, gain adjustment block 950, and additive noise block 960. The functional blocks included in method 900 may depend on the distortions or effects that are desired to be simulated. Method 900 may include one of, one or more of, or all of blocks 910-960, and in some embodiments additional blocks may be added to simulate other distortions and/or effects.

As described above, the plurality of blocks of method 900 may each represent a function and may be implemented as one or more of the function 306a, 306b, . . . 306n (FIG. 3). In another example, two or more of the plurality of blocks can be grouped together as a single "process" 915 that perform functions in a similar manner to the process 315 of FIG. 4. That is, a plurality of blocks of FIG. 9 may be grouped together as process 915 and executed in multiple, parallel iterations as the processing blocks 315a, 315b, . . . 315n (FIG. 4), etc. For example, as shown in FIG. 9, all function blocks 910-960 are grouped into a single process 915, with the grouped functions replicated in multiple processing blocks 315a-315n. The number of processing blocks 315a-315n may be replicated as many times as desired to achieve the required processing rate and throughput. While blocks 305, 310, 320, and 325 are not illustrated in FIG. 9, it will be understood that such blocks may be present such that input data may be ingested (305) and split (310) to perform the process 915 as processing blocks 315a-315n and that the resulting processed data may then be combined (320) and output (325) for downstream processing.

While FIG. 9 illustrates all functional blocks grouped into a process 915, embodiments herein are not so limited. The functional blocks 910-960 may be grouped in many different ways. For example, fewer than all of the functional blocks 910-960 (e.g., two or more) may be grouped as a process (e.g., process 915). As an illustrative example, functional blocks 910 and 920 may be grouped together as a first process 915 and processing distributed across first one or more processing blocks 315a-315n and functional blocks 930-960 may be grouped together as a second process 915 and processing distributed across second one or more processing blocks 315a-315n. Furthermore, while blocks 305, 310, 320, and 325 are not illustrated in FIG. 9, it will be understood that such blocks may be present prior to each process 915 such that input data may be ingested (305) and split (310) to perform the grouped functions of process 915 (e.g., as processing blocks 315a-315n) and that the resulting processed data may then be combined (320) and output (325) for downstream processing.

In various examples, the plurality of blocks of FIG. 9 may be implemented using SIMD processing techniques as described throughout the present disclosure. SIMD techniques may offer increased throughput and minimized memory bandwidth requirements. Increasing the functionality of each processing block executed using SIMD techniques may provide increased minimization of memory bandwidth requirements.

At block 910, the processor 202 (e.g., one or more of the cores 204) can simulate signal distortions on an input signal. Block 910 can impart simulations of one or of non-linear distortions (AM-PM), in-phase/quadrature (I/Q) imbalance distortions, scintillation distortions, multi-path distortions onto the input signal so to simulate a signal that has experienced such distortions. For example, a complex finite impulse response (FIR) filter may be used to simulate the above noted distortions, except for AM-PM distortions. Examples of an FIR filter can be implemented using SIMD techniques to improve throughput. The FIR filter coefficients can be set to achieve simulation of the desired distortions. For AM-PM distortion, a non-linear operation may be performed, for example, a look up table to complicated non-linear math operations.

At block 920, the processor 202 (e.g., one or more of the cores 204) can simulate phase noise on an input signal. Block 920 can impart simulation of phase noise onto an input signal so to simulate phase noise. For example, colored noise may be added to a carrier that is mixed with the input signal. One way to create the colored noise is to shape white noise using a FIR filter (which may be the same FIR filter of block 910 or a different FIR filter) to achieve the desired shape of the noise. The noise can be created in decade steps, such that bands from 0.1 to 1 Hz can be created, then interpolated and added to another stage of noise running from 1 Hz to 10 Hz. This process can be repeated as many times as needed to cover the needed phase noise bandwidth. In each step, the generation, filtering, and interpolation of noise can be achieved using SIMD techniques. This colored noise is then used to adjust the phase of either a carrier signal or a complex vector that starts at (1,0). This phase adjusted signal or vector can then be multiplied with the input signal, resulting in added phase noise onto the input signal.

At block 930, the processor 202 (e.g., one or more of the cores 204) can perform carrier adjustment by adjusting the phase of the input signal over time. Block 930 may be performed in a manner similar to block 920, but at block 930 the phase of the mixing carrier changes over time to achieve the desired carrier frequency and phase adjustment. Block 930 may be used for, but not limited to, simulating the carrier frequency change from the motion of a moving platform (e.g., platform 110 and/or satellite 111 of FIG. 1), or more generically motion of either the transmitter or receiver, referred to as Doppler effects.

At block 940, the processor 202 (e.g., one or more of the cores 204) can perform timing adjustments to simulate effects of a moving platform (e.g., platform 110 and/or satellite 111). For example, such movement may stretch or increase the length of the input signal in time. Block 940 may apply a polyphase filter that uses adjustable delay taps. Block 940 may be similar to the time adjust block 540 of FIGS. 5 and 6; however, the timing information for block 940 is driven by a user input to simulate the desired effects, instead of a result of analyzing an input signal.

At block 950, the processor 202 (e.g., one or more of the cores 204) can perform gain adjustment to simulate rain fade or anything else that can impact signal power. Block 950 may be performed by multiplication of the amplitude of input signal.

At block 960, the processor 202 (e.g., one or more of the cores 204) can add noise to an input signal. For example, block 960 may simulate Additive Gaussian White Noise (or any type of noise (e.g., colored or other kind of distribution like Rayleigh) and impart the noise onto the input signal. There are many ways to generate Gaussian white noise and the Box-Muller approach is one method that is known in the art.

While the blocks 910-960 are depicted in a particular order, it will be appreciated that the embodiments herein are not limited to only the illustrated order. Blocks 910-960 may be executed in any order as desired and/or executed in parallel on an input signal.

Signal Modulator Running on General Purpose CPUs Employing Parallel Processing on Multiple Cores to Achieve High Through-Put Operating in a Cloud Environment:

As described above, FIG. 10 is a functional block diagram of an example implementation of method 1000. In various examples, method 1000 may be an example of a signal modulation method. A modulator may be used to generate waveforms to send information from one place to another. For example, downlink signals (e.g., downlink signals 160 and/or 170 of FIG. 1) may be modulated according to method 1000. For example, the information could be broken down into digital information or could be an analog signal such as used in AM and FM radios. Generation of digital signals are used as an example herein, but the same approach could also be used to generate analog signals.

FIG. 10 illustrates an example signal modular as method 1000. Method 1000 is a Phase-Shift-Keying (PSK) modulator method that supports modulation types such as B/Q/SQ/8/16A/32APSK/etc., Quadrature-Amplitude-Modulation (QAM), or any similar digital modulation waveforms. While FIG. 10 illustrates one example modulation method, the same approach of signal processing (e.g., as described in FIGS. 3 and 4) may be applied to other modulation methods.

Method 1000 comprises a plurality of functional blocks as shown in FIG. 10. For example, in the illustrative example of FIG. 10, the method 1000 includes one or more of frame builder block 1010, Forward Error Correction (FEC) block 1020, pulse shaper block 1030, center frequency adjustment block 1040, and sweeper block 1050.

While specific blocks and arrangements are illustrated in FIG. 10, certain modulation schemes might require different blocks. Thus, FIG. 10 illustrates a high-level modulation method and is not a catch-all configuration. One or more additional functional blocks may be added to method 1000 as desired to execute different modulation schemes. To the extent a certain modulation scheme does not fall into the arrangement of FIG. 10, one skilled in the art will appreciate that the concepts disclosed in connection to the various embodiments throughout this disclosure apply equally to the modulation method of FIG. 10 as well as any modulation scheme.

As described above, the plurality of blocks of method 1000 may each represent a function and may be implemented as one or more of the function 306a, 306b, . . . 306n (FIG. 3). In another example, two or more of the plurality of blocks can be grouped together as a single "process" 1015 that performs functions in a similar manner to the process 315 of FIG. 4. That is, a plurality of blocks of FIG. 10 may be grouped together as process 1015 and executed in multiple, parallel iterations as the processing blocks 315a, 315b, . . . 315n (FIG. 4), etc. For example, as shown in FIG. 10, functional blocks 1010 and 1020 are grouped together as a first process 1015, which is then replicated in first multiple processing blocks 315a-315n, and functional blocks 1030-1050 are grouped together as a second process 315, which is then replicated in second multiple processing blocks 315a-315n. While FIG. 10 illustrates certain functional blocks grouped into separate process 1015, embodiments herein are not so limited. The functional blocks 1010-1050 may be grouped in many different ways. For example, all functional blocks 1010-1050 may be grouped together.

Method 10 also illustratively includes data ingest blocks 1005 and data split blocks 1010 prior to each process 1015. Each of data ingest blocks 1005 may be substantially similar to the data ingest block 305 (FIG. 4) and each data split block 1010 may be substantially similar to the data split block 310 (FIG. 4). Accordingly, input data may be ingested (1005), in which the processor 202 receives data for processing, and split (1010), in which the processor 202 can parse data in overlapping blocks of data, for example, as described in connection to FIG. 4. Furthermore, after each process 1015, method 10 also illustratively includes data combine blocks 1020 and data output blocks 1025. Each of data combine blocks 1020 may be substantially similar to the data combine block 320 (FIG. 4) and each data output block 1025 may be substantially similar to the data output block 325 (FIG. 4). Accordingly, the process 1015 outputs overlapping blocks of data that are combined (1020) and outputs the data (1025), for example, as described in connection to FIG. 4.

In various examples, the plurality of blocks of FIG. 10 may be implemented using SIMD processing techniques as described throughout the present disclosure. SIMD techniques may offer increased throughput and minimized memory bandwidth requirements. Increasing the functionality of each processing block executed using SIMD techniques may provide increased minimization of memory bandwidth requirements.

At block 1010, the processor 202 (e.g., one or more of the cores 204) can convert incoming data of an input signal to a predetermined format that is based on the desired modulation scheme (e.g., the modulation scheme of the receiver, such as antennas 122, 132, and/or 134). For example, certain modulation schemes require a specific format and block 1010 converts data of the input signal to that format. The modulator method 1000 can support many different waveform standards, such as, but not limited to DVB-S2, DVB-S2x as well as less standardized cases that use Reed-Solomon Coding, Turbo Coding, Convolutional Coding, etc. For simplicity sake, waveform standards are grouped into two cases: Streaming Data and Framed Data. Streaming data cases are where the incoming data is a continuous, unbroken stream, like uncoded or convolutional coding. Framed Data is for incoming data that requires framed or blocks of data like DVB-S2 or Reed-Solomon. Block 1010 can build a frame (e.g., for framed data) or data stream (e.g., for streaming data) by converting the incoming data to the format corresponding to the modulation scheme.

At block 1020, the processor 202 (e.g., one or more of the cores 204) generates coding corresponding to the modulation scheme of the method 1010, including, but not limited to BCH and LDPC for DVB-S2, LDPC coding for CCSDS, Reed-Solomon, turbo coding, polar coding, and convolutional coding. Block 1020 may be one of the more complicated blocks for the modulator method 1000 and therefore may benefit from all of the signal processing methods (e.g., FIGS. 3 and/or 4) and SIMD techniques disclosed throughout this disclosure.

At block 1030, the processor 202 (e.g., one or more of the cores 204) converts symbol data to samples, for example, by applying a pulse shape filter. Block 1030 can create any pulse shape, for example, Root-Raised-Cosine (RRC). The pulse shaper may be a combination of a polyphase-filter with a Numerically-Controlled-Oscillator (NCO). Block 1030 may also be a complicated block and therefore may benefit from all of the signal processing methods (e.g., FIGS. 3 and/or 4) and SIMD techniques disclosed throughout this disclosure.

At block 1040, the processor 202 (e.g., one or more of the cores 204) can change the center frequency of the carrier of the sample data from block 1030 using a complex multiply. At block 1040, the processor 202 (e.g., one or more of the cores 204) can change the phase and frequency over time based on predefined profile corresponding to the modulation scheme. In some implementations, block 1050 is executed while the center frequency is adjusted via block 1040.

Other Aspects

The accompanying claims and their equivalents are intended to cover such forms or modifications as would fall within the scope of the disclosure. The various components illustrated in the figures may be implemented as, for example, but not limited to, software and/or firmware on a processor or dedicated hardware. Also, the features and attributes of the specific example embodiments disclosed above may be combined in different ways to form additional embodiments, all of which fall within the scope of the disclosure.

The foregoing method descriptions and the process flow diagrams are provided merely as illustrative examples and are not intended to require or imply that the operations of the various embodiments must be performed in the order presented. As will be appreciated by one of skill in the art, the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or codes on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

What is claimed is:

1. A method for combining a plurality of downlink signals representative of a communication signal, the method comprising:
   receiving samples of the plurality of downlink signals from a plurality of antenna feeds;
   generating first symbols for a first signal of the plurality of downlink signals based on performing a first timing recovery operation on first samples of the first signal;
   generating second symbols for a second signal of the plurality of downlink signals based on performing a second timing recovery operation on second samples of the second signal;
   generating time and phase offset information based on performing a correlator operation on the first and second symbols; and
   combining the first signal and the second signal based on (i) the first and second symbols, (ii) aligning timing and phase of the first symbols with the second symbols based on the time and phase offset information, and (iii) performing a weighted combiner operation that applies scaling to each of the first and second signals based on corresponding signal quality,
   wherein at least one of the first timing recovery operation, the second timing recovery operation, the correlator operation, and the combing are performed in a plurality of processing blocks in one or more processors, wherein the first and second processing block operate in parallel.

2. The method of claim 1, wherein the plurality of processing blocks comprises a plurality of central processing unit (CPU) cores.

3. The method of claim 1, wherein the one or more processors comprises a plurality of processors, wherein in a first one or more processing blocks of the plurality of processing blocks are comprised in a first processor of the plurality of processors and a second one or more processing blocks of the plurality of processing blocks are comprised in a second processor of the plurality of processors.

4. The method of claim 1, wherein the one or more processors comprises a single processor comprising a first one or more processing blocks of the plurality of processing blocks and a second one or more processing blocks of the plurality of processing blocks.

5. The method of claim 1, wherein the first timing recovery operation is performed in the plurality of processing blocks, the plurality of processing blocks comprising at least a first processing block and a second processing block, wherein the first processing block performs the first timing recovery operation on a first portion of the first samples and the second processing block performs the first timing recovery operation on a second portion of the first samples, wherein the first and second processing block operate in parallel.

6. The method of claim 1, wherein the plurality of processing blocks comprises:
   at least a first processing block that performs at least one of the first timing recovery operation, the second timing recovery operation, the correlator operation, and the combining; and
   at least a second processing block that performs the at least one of the first timing recovery operation, the second timing recovery operation, the correlator operation, and the combining,
   wherein the first and second processing block operate in parallel.

7. The method of claim 1, further comprising:
   generating first corrected symbols based on performing a first carrier recovery operation on the first symbols; and
   generating second corrected symbols based on performing a second carrier recovery operation on the second symbols.

8. The method of claim 7, wherein the plurality of processing blocks performs the first timing recovery operation and the first carrier recovery operation, wherein the plurality of processing blocks comprises at least:
   a first processing block that performs the first timing recovery operation and the first carrier operation on a first portion of the first samples; and
   a second processing block that performs the first timing recovery operation and the first carrier operation on a second portion of the first samples.

9. The method of claim 7, wherein the plurality of processing blocks comprises a first one or more processing blocks that performs the first timing recovery operation and first carrier recovery operation and a second one or more processing blocks that performs the second timing recovery operation and second carrier recovery operation.

10. The method of claim 7, wherein the plurality of processing blocks comprises a first one or more processing blocks that performs the first timing recovery operation and the second timing recovery operation and a second one or more processing blocks that performs the first carrier recovery operation and and the second carrier recovery operation.

11. The method of claim 7, wherein
the first timing recovery operation and the first carrier recovery operation are part of a first match filter, and
the second timing recovery operation and the second carrier recovery operation are part of a second match filter.

12. The method of claim 1, further comprising generating corrected symbols based on performing a carrier recovery operation on the combined first and second signals.

13. The method of claim 12, wherein
the first timing recovery operation, the second timing recovery operation, and the carrier recovery operation are part of a match filter.

14. The method of claim 1, wherein the one or more processors are one or more general-purpose central processing units (CPU).

15. The method of claim 1, wherein the one or more processors employ single instructions, multiple data (SIMD) techniques to achieve high throughput.

16. A system for combining a plurality of downlink signals representative of a communication signal, the system comprising:
a plurality of antennas configured to receive the plurality of downlink signals; and
one or more processors communicatively coupled to the plurality of antennas, the one or more processors having a plurality of processing blocks and operable to:
receive samples of the plurality of downlink signals from a plurality of antenna feeds;
generate first symbols for a first signal of the plurality of downlink signals based on performing a first timing recovery operation on first samples of the first signal;
generate second symbols for a second signal of the plurality of downlink signals based on performing a second timing recovery operation on second samples of the second signal;
generate time and phase offset information based on performing a correlator operation on the first and second symbols; and
combine the first signal and the second signal based on (i) the first and second symbols, (ii) aligning timing and phase of the first symbols with the second symbols based on the time and phase offset information, and (iii) performing a weighted combiner operation that applies scaling to each of the first and second signals based on corresponding signal quality,
wherein at least one of the first timing recovery operation, the second timing recovery operation, the correlator operation, and the combing are performed in a plurality of processing blocks in one or more processors, wherein the first and second processing block operate in parallel.

17. The system of claim 16, wherein the plurality of processing blocks comprises a plurality of central processing unit (CPU) cores.

18. The system of claim 16, wherein the one or more processors comprises a plurality of processors, wherein in a first one or more processing blocks of the plurality of processing blocks are comprised in a first processor of the plurality of processors and a second one or more processing blocks of the plurality of processing blocks are comprised in a second processor of the plurality of processors.

19. The system of claim 16, wherein the one or more processors employ single instructions, multiple data (SIMD) techniques to achieve high throughput.

20. An apparatus for combining a plurality of downlink signals representative of a communication signal, the apparatus comprising:
a means for receiving samples of the plurality of downlink signals from a plurality of antenna feeds;
a means for generating first symbols for a first signal of the plurality of downlink signals based on performing a first timing recovery operation on first samples of the first signal;
a means for generating second symbols for a second signal of the plurality of downlink signals based on performing a second timing recovery operation on second samples of the second signal;
a means for generating time and phase offset information based on performing a correlator operation on the first and second symbols; and
a means for combining the first signal and the second signal based on (i) the first and second symbols, (ii) aligning timing and phase of the first symbols with the second symbols based on the time and phase offset information, and (iii) performing a weighted combiner operation that applies scaling to each of the first and second signals based on corresponding signal quality,
wherein at least one of the means for generating first symbols, the means for generating second symbols, the means for generating time and phase offset information, and the means for combining are performed in a plurality of processing blocks in one or more processors, wherein the first and second processing block operate in parallel.

* * * * *